United States Patent
Iversen et al.

(10) Patent No.: US 11,111,445 B2
(45) Date of Patent: Sep. 7, 2021

(54) SEPARATION SYSTEM FOR HIGH PRESSURE PROCESSING SYSTEM

(71) Applicant: STEEPER ENERGY APS, Hørsholm (DK)

(72) Inventors: Steen Brummerstedt Iversen, Vedbæk (DK); Claus Uhrenholt Jensen, Aalborg (DK); Göran Olofsson, Bunkeflostrand (SE); Julie Katerine Rodriguez Guerrero, Calgary (CA); Andrew Ironside, Calgary (CA); Sergios Karatzos, Calgary (CA); Ling Li, Calgary (CA)

(73) Assignee: STEEPER ENERGY APS, Hørsholm (DK)

( * ) Notice: Subject to any disclaimer, the term of this patent is extended or adjusted under 35 U.S.C. 154(b) by 0 days.

(21) Appl. No.: 16/499,010

(22) PCT Filed: Mar. 22, 2018

(86) PCT No.: PCT/EP2018/057283
§ 371 (c)(1),
(2) Date: Sep. 27, 2019

(87) PCT Pub. No.: WO2018/177877
PCT Pub. Date: Oct. 4, 2018

(65) Prior Publication Data
US 2020/0056107 A1    Feb. 20, 2020

(30) Foreign Application Priority Data

Mar. 30, 2017    (DK) .......................... PA 2017 70234

(51) Int. Cl.
*C10G 31/06*    (2006.01)
*C10G 31/08*    (2006.01)
(Continued)

(52) U.S. Cl.
CPC ............... *C10G 31/06* (2013.01); *C10G 1/00* (2013.01); *C10G 31/08* (2013.01); *C10G 33/00* (2013.01);
(Continued)

(58) Field of Classification Search
CPC .... C10G 1/00–10; C10G 31/06; C10G 31/08; C10G 33/00; C10G 33/06; C10G 33/08
See application file for complete search history.

(56) References Cited

U.S. PATENT DOCUMENTS

| | | | |
|---|---|---|---|
| 2007/0267325 A1 | 11/2007 | Vu | |
| 2009/0218062 A1* | 9/2009 | Schinski | C10G 3/47 162/189 |

(Continued)

FOREIGN PATENT DOCUMENTS

| | | |
|---|---|---|
| CA | 2 772 095 A1 | 10/2012 |
| EP | 1 586 620 A1 | 10/2005 |

(Continued)

*Primary Examiner* — Renee Robinson
(74) *Attorney, Agent, or Firm* — Birch, Stewart, Kolasch & Birch, LLP.

(57) ABSTRACT

The invention relates to a method of separating and purifying products from a high pressure processing system adapted for processing a feed stream comprising carbonaceous material at a pressure of at least 150 bar and a temperature of at least 300° C., where the converted feed stream (product mixture) is cooled to a temperature in the range 50 to 250° C., and depressurized to a pressure in the range 1 to 150 bar, the method comprising separating the depressurized product mixture in gas phase, an oil phase (liquid hydrocarbon), and a water phase comprising water soluble organics, dissolved salts and optionally suspended particles in a first phase separator and purifying the oil phase from the first phase separator by mixing it with one or more washing agents, at least one of which comprises water, and separating the oil phase from the one or more washing agents in a further separation step.

31 Claims, 11 Drawing Sheets

(51) Int. Cl.
*C10G 1/00* (2006.01)
*C10G 53/10* (2006.01)
*C10G 67/14* (2006.01)
*C10G 33/00* (2006.01)

(52) U.S. Cl.
CPC .............. *C10G 53/10* (2013.01); *C10G 67/14* (2013.01); *C10G 2300/1014* (2013.01); *C10G 2300/302* (2013.01); *C10G 2300/308* (2013.01)

(56) References Cited

U.S. PATENT DOCUMENTS

| | | | |
|---|---|---|---|
| 2013/0140216 A1 | 6/2013 | Wickes et al. | |
| 2014/0099691 A1* | 4/2014 | Iversen | C10G 1/10 435/166 |
| 2014/0128646 A1* | 5/2014 | Iversen | C10G 1/042 585/240 |
| 2015/0259606 A1 | 9/2015 | Iversen | |

FOREIGN PATENT DOCUMENTS

| | | | | |
|---|---|---|---|---|
| WO | WO 2015/092773 | * | 6/2015 | ............... C10G 1/02 |
| WO | WO 2015/169319 | * | 11/2015 | ............... C10G 1/06 |
| WO | WO 2016/058098 A1 | | 4/2016 | |
| WO | WO 2018/011139 A1 | | 1/2018 | |

\* cited by examiner

1. Product inlet
2. Product flow distributor
3. Calming baffle plate
4. Wave & foam breaker
5. Coalescer plate
6. Weir plate/Solid plate
7. Liquid level control
8. Oil level control
9. Mist extractor
10. Gas outlet
11. Water outlet
12. Oil outlet

SEPARATION SYSTEM FOR HIGH PRESSURE PROCESSING SYSTEM

FIELD OF THE INVENTION

The present invention relates to the area of separation systems, in particular separation systems for use in high pressure continuous processing systems, where separation of the products from the high pressure process is needed.

BACKGROUND OF THE INVENTION

Numerous applications of high pressure continuous processes exist or are under development or in early stages of commercialization. Examples of such processes are hydrothermal and solvothermal processes e.g. for production of hydrocarbons such as transportation fuels, lubricants or speciality chemicals and gases from carbonaceous materials such as biomass.

The products from the high pressure conversion process typically comprise a pressurized mixture of hydrocarbons, gas, water with water soluble organics and dissolved salts, and optionally suspended solids such as inorganics and/or char and/or unconverted carbonaceous material depending on the specific carbonaceous material being processed and the specific processing conditions.

Various separation techniques are known in the art of conventional oil production. In the area of application of such on hydrocarbons produced from carbonaceous material by use of hydrothermal or solvothermal processes the information on separation is limited. Hydrocarbons produced in this manner will have some characteristics similar to fossil hydrocarbons and will further differ in other areas. The so produced hydrocarbons will, compared to fossil oils, typically be more polarized, have a high viscosity due to relatively high oxygen content and often show a density close to the density of water. Use of conventional separation methods known from the fossil oil applications on the so produced hydrocarbons has shown that the hydrocarbons after such separation contain too much water and/or too many inorganics for many applications.

Often the product stream from the high pressure conversion process is depressurized to ambient conditions and cooled to a temperature below the boiling point of water to allow for subsequent separation into the individual phases. However, whereas different techniques have been generically proposed for separation of the individual phases including solvent extraction (Downie (WO 2014/197928)), distillation (Downie (WO 2014/197928)), cyclones such as hydrocyclones (Iversen (U.S. Pat. No. 921,317B2), Humfreys (WO2008AU00429), Annee, (EP0204354), Van de Beld (EP1184443),), filtration (Iversen (WO2015/092773), Iversen (US921317B2), Annee (EP0204354), Downie (WO 2014/197928), Iversen (WO 2006/117002)), decanting (Yokoyama (U.S. Pat. No. 4,935,567), Modar (WO 81/00855)), centrifugation (Iversen (WO2015/092773), Iversen (US921317B2), Iversen, (WO2006/117002), Annee (EP0204354)) membrane separation (Modar (WO81/00855), Iversen (WO2006/117002)), only limited details as to the equipment design and separation conditions and operation have been disclosed in the prior art.

A general problem of such prior art separation systems is that the separated oil product often contains too high levels of water and inorganics, which limits the quality of the oil (hydrocarbons) and its further use in e.g. catalytic upgrading processes to transportation fuels, lubricants or speciality chemicals.

Accordingly, improved and more efficient separation schemes for purifying/reducing contaminants such as water and/or inorganics from the oil phase produced from such high pressure processes are desirable.

OBJECTIVE OF THE INVENTION

The object of the present invention is to therefore provide for a separation system as well as a method of operating such system that reduces the amount of water and/or inorganics in the hydrocarbon product from the high pressure process system. Secondary objectives include providing a separation system that is more effective or economical than the prior art.

DESCRIPTION OF THE INVENTION

According to one aspect of the present invention the objective of the invention is achieved through a method of separating and purifying products from a high pressure processing system adapted for processing a feed stream comprising carbonaceous material at a pressure of at least 150 bar and a temperature of at least 300° C., where the converted feed stream (product mixture) is cooled to a temperature in the range 50 to 250° C., and depressurized to a pressure in the range 1 to 150 bar, the method comprising separating the depressurized product mixture in a gas phase, an oil phase (liquid hydrocarbon), and a water phase comprising water soluble organics, dissolved salts and optionally suspended particles in a first phase separator and purifying the oil phase from the first phase separator by mixing it with one or more washing agents, and separating the oil phase from the one or more washing agents in at least one further separation step.

Advantageously the converted feed stream (product mixture) is depressurized to a pressure in the range 10 to 150 bar prior to entering the first separator.

By applying such method for separating the content of water and/or inorganics such as ashes will be reduced significantly compared to previously known methods.

It should be noted that the method is defined as comprising separating the product mixture in gas phase, an oil phase (liquid hydrocarbon), and a water phase comprising water soluble organics, dissolved salts and optionally suspended particles. This is intended to mean that the three phases comprises essentially gas, liquid hydrocarbon and water, but it should be understood that each phase may also contain other components, where the subsequent further separation process serves the purpose of further purifying in particular the liquid hydrocarbon phase. it should further be appreciated that the word "liquid hydrocarbon" or oil in the present context is used to comprise a broad spectrum of products including such comprising not only hydrogen and carbon but also heteroatoms such as oxygen, sulphur, nitrogen and others.

In an embodiment part of the oil phase is withdrawn after the first separator and recycled to the feed mixture preparation step of the high pressure processing step. Hereby the amount of oil being treated in the further separation step is reduced, and an overall more economical process is obtained.

The at least one further separation step may comprise one or more phase separators, where in each of such separation steps the oil phase is separated from at least one washing agent added to the oil phase prior to entering the additional separation step. As the additional separation steps provided for separating the oil phase and the washing agent may comprise a number of such steps it is foreseen that the same or different washing agent(s) may be added between the different separation steps.

In an embodiment at least one of the washing agents comprises water.

The weight ratio of the washing agent added in the form of water prior to each of the one or more separators in the further separation step to the amount of oil to be purified in each of separators in the further separation step is according to a preferred embodiment of the present invention in the range 0.01 to 2.0 such as a weight ratio in the range 0.01 to 1.0; preferably the weight ratio of the washing agent added in the form of water prior to each of the one or more separators in the further separation step to the amount of oil to be purified is in the range 0.02 to 0.5 such as a weight ratio in the range 0.02 to 0.35; most preferably the weight ratio of the washing agent added in the form of water prior to each of the one or more separators in the further separation step to the amount of oil to be purified is in the range 0.03 to 0.2.

In an embodiment at least one acidifying agent is added to one or more washing agents prior to mixing it before entering the further separation step. Suitable acidifying agent(s) according to the present invention include acetic acid and/or citric acid. Typically the acid is added in an amount so that the pH of the separated washing agent from the separators in the further separation step is in the range from about 2.0 to about 7.0 such as a pH in the range from about 2.5 to about 6.5; preferably the pH of the separated washing agent is in the range from about 3.0 to 6.0 such as in the range from 3.0 to 5.0.

By reducing the pH to the specified ranges according to the present invention it is obtained that compounds such as potassium and sodium that may be bound to acidic groups of the oil as soaps are dissolved. Further the solubility of metals are also increased by reducing the pH. Further at too low pH it has been found that stable emulsions may be formed.

In a further embodiment gas is separated from the converted feed stream in a flash separator prior to entering the first phase separator.

In an embodiment the pressure of the flash separator for separating gas from the residual product stream is in the range 10 to 150 bar such as in the range 30 to 100 bar; preferably the pressure of the flash separator for separating gas from the residual product stream is in the range 30 to 100 bar such as 50 to 100 bar.

A particularly preferred embodiment of the present invention is where the acidifying agent comprises or further comprises separated $CO_2$ containing gas produced by the conversion process of the carbonaceous material.

In one embodiment the dynamic viscosity of the oil phase during said separation and purification is in the range 0.1 to 30 cP, such as in the range 1 to 15 cP.

In an embodiment the one or more washing agents comprises a viscosity and/or density reducing agent having a boiling point of less than 150° C., such as less than 100° C.

A preferred embodiment is where the viscosity and/or density reducing agent(-s) comprises one or more ketones such as acetone and/or propanones and/or buthanones such as Methyl Ethyl Ketone (MEK) and/or pentanones, and or pentenones and/or cyclopentanonees such as 2,5 dimethyl-cyclo-pentanone and/or hexanones and/or hexanones such as 3 3-methyl hexanones and/or cyclohexanones and/or heptanones, and/or one or more alcohols such as methanol, ethanol, propanol, isopropanol buthanol, isobutanol and/or one or more aromatic compounds such as toluene, xylene, cumene, ethyl benzene, 1,2,4 tri methyl benzene, 1,3,5 trimethyl benzene, 1,2,3 trimethyl benzene and/or one or more alkanes such as pentanes, hexanes, heptanes, octanes, nonanes, decanes, dodecanes or a combination thereof.

A particularly preferred embodiment is where the viscosity and/or density reducing agent(-s) comprises one or more ketones in a concentration in the range 30-60% by weight, and one or more alcohols in a concentration in the range 5-30% by weight, and one or more aromatics in a concentration in the range 10 to 40% by weight, and one or more alkanes in the concentration in the range 10 to 30% by weight.

In an embodiment the viscosity and/or density reducing agent comprises a low boiling fraction of the oil from the converted feed mixture comprising carbonaceous material.

In an embodiment the weight ratio of the viscosity and/or density reducing agent added to the amount of oil are in the range 0.01 to 2, such as in the range 0.2 to 0.4, such as in the range 0.2 to 0.35.

In an embodiment the operating pressure of the first separator is in the range 1 to 74 bar preferably 10 to 74 bar, preferably in the range 15 to 50 bar; more preferably in the range 15 to 40 bar such as in the range 20 to 35 bar.

In an embodiment the operating pressure of the one or more separators in the further separation step is in the range 1 to 74 bar preferably 10 to 74 bar, preferably in the range 15 to 50 bar; preferably in the range 15 to 40 bar such as a pressure in the range 20 to 35 bar.

In an embodiment the separated process gas is at least partly introduced to the second phase separator such as by mixing it with the washing agent comprising water before being mixed with the oil and entering the phase separator for separation of the oil and washing agent.

In an embodiment the temperature in the first separator and/or the one or more separators in the further separation step is/are in the range 120 to 200° C., preferably in the range 120 to 180° C. such as in the range 130 to 170° C.

In an embodiment the residence time in each of the first separator and/or the one or more separators in the further separation step is/are in the range 0.1 to 30 minutes, preferably in the range 1 to 20 minutes such as in the range 2 to 15 minutes; most preferably the residence time in each of the first separator and the separators in the further separation step are in the range 2 to 10 minutes.

In an embodiment the purified oil phase after the washing and separation steps in the further separation step is flashed thereby producing a gas stream comprising low boiling hydrocarbons and a water and an oil stream. In many embodiments of the present invention the pressure in the flash distillation step is about ambient such as in the range 1 to 2 bar. However, in another embodiment the pressure in the flash distillation may be operated under a vacuum e.g. at a pressure in the range 0.1 to 1.0 bar such as in the range 0.5 to 1.0 bar.

In an embodiment the temperature of the flash step is in the range 80 to 150° C.; preferably in the range 100 to 150° C.; even more preferably in the range 110 to 140° C.

In an embodiment the gas stream from said flash step is condensed, and further separated into a light hydrocarbon liquid phase, a gas phase and a water phase.

In an embodiment the separated light hydrocarbon phase is at least partly recycled and mixed with the oil phase from the first separator prior to entering the one or more separators in the further separation step.

In an embodiment the separated light hydrocarbon phase is at least partly mixed with the separated oil phase from the flash separator.

In an embodiment the liquid phase comprising washing agent(s) withdrawn from the one or more phase separators in the further separation step is at least partly recycled and mixed with the oil phase from the previous separator prior to entering the subsequent separator in the further separation step.

In an embodiment the oil from the separation or at least a fraction thereof is further subjected to an upgrading process, where it is pressurized to a pressure in the range from about 20 bar to about 200 bar; preferably in the range 50 to 120 bar, and subsequently mixed with hydrogen and heated to a temperature in the range 250 to 400° C. in one or more steps, and contacted with one or more hydrotreating and/or hydro-processing catalysts and/or hydrocracking catalyst in one or more reaction zones, and optionally separated such as by fractionation into different boiling point fractions.

BRIEF DESCRIPTION OF THE DRAWINGS

The invention will in the following be described with reference to one embodiment illustrated in the drawings where.

DESCRIPTION OF A PREFERRED EMBODIMENT

Figure 1:
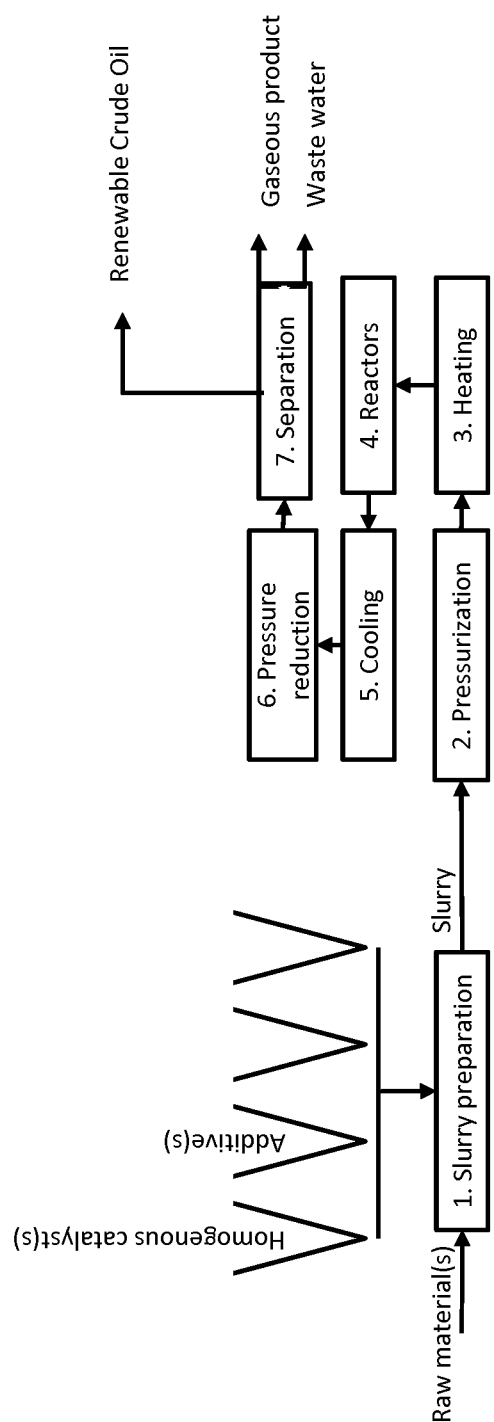
FIG. 1 shows a schematic overview of a continuous high pressure process for transforming carbonaceous materials into renewable hydrocarbons.

FIG. 1 shows an embodiment of a continuous high pressure production process for conversion of carbonaceous materials such as biomass to renewable oil comprising pumping means and pressurization means according to the present invention.

As shown in FIG. 1, the carbonaceous material is first subjected to a feed mixture preparation step (1). The feed mixture preparation step transforms the carbonaceous material into a pumpable feed mixture and often includes mechanical means for size reduction of the carbonaceous and slurrying the carbonaceous material with other ingredients such as water, catalysts and other additives such as organics in the feed mixture. In a preferred embodiment of the present invention, the feed mixture may be preheated in the pretreatment step. Often the feed mixture is preheated to a temperature in the range from about 150° C. to about 250° C. in the pretreatment step such as temperature in the range from about 150° C. to about 220° C. Preferably the feed mixture is preheated to a temperature in the range from about 160° C. to about 200° C. such as in the range from about 160° C. to about 180° C.

Advantageously this is performed by transferring heat from the high pressure water cooler via a heat transfer medium such as hot oil or steam, whereby the overall heat recovery and energy efficiency are increased.

The second step is a pressurization step (2) where the feed mixture is pressurized by pumping means to a pressure of at least 150 bar and up to about 450 bar such as a pressure of least 180 bar and up to 400 bar; preferably the feed mixture is pressurized by pumping means to a pressure above the critical point of water such as a pressure of least 250 bar; more preferably the feed mixture is pressurized by pumping means to a pressure of at least 300 bar such as at least 320 bar. A particularly preferred embodiment according to the present is a feed mixture pressure after the pumping means of 320 to 350 bar.

The pressurized feed mixture is subsequently heated to a reaction temperature in the range from about 300° C. and up to about 450° C., such as a temperature in the range from about 340° C. to about 430° C.; preferably the pressurized feed mixture is subsequently heated to a reaction temperature in the range from about 370° C. and up to about 425° C., such a temperature in the range from about 390° C. to about 420° C.

The feed mixture is generally maintained at these conditions in sufficient time for conversion of the carbonaceous material e.g. for a period of 2 to 30 minutes, such as in the range 3 to 20 minutes; and preferably in the range 5 to 15 minutes, before it is cooled and the pressure is reduced.

The product mixture comprising liquid hydrocarbon product, water with water soluble organics and dissolved salts, gas comprising carbon dioxide, hydrogen, and methane as well as suspended particles from said converted carbonaceous material is subsequently cooled to a temperature in the range 50° C. to 250° C. such as in the range 120 to 180° C.;

The cooled product mixture thereafter enters a pressure reducing device, where the pressure is reduced from the conversion pressure to a pressure of less than 200 bar such as a pressure of less than 120 bar. Preferably the pressure is reduced to less than 100 bar such as less than 80 bar. More preferably the pressure is reduced to less than 50 bar such as a pressure in the range 10 bar to 40 bar.

Figure 7:
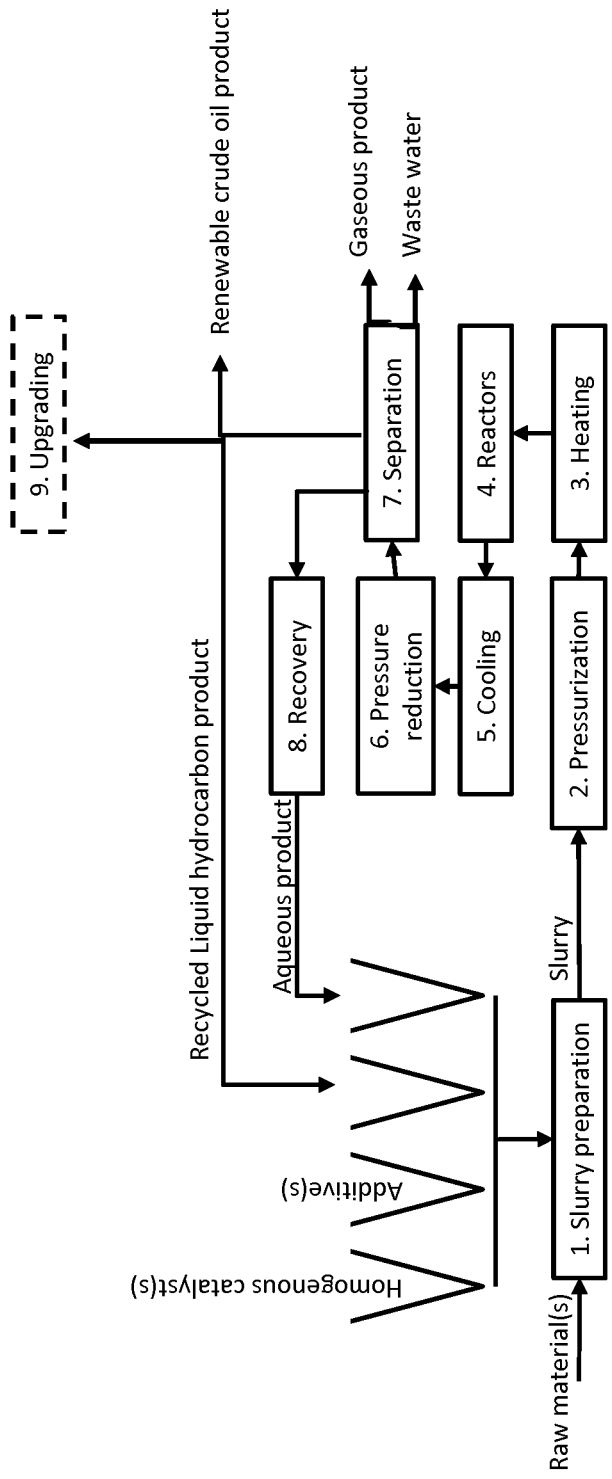
FIG. 7 shows a schematic overview of an advantageous embodiment of a high pressure process adapted for processing a feed stream comprising carbonaceous material and an advantageous separation system according to the invention.

Suitable pressure reduction devices include pressure reduction devices comprising a number of tubular members in a series and/or parallel arrangement with a length and internal cross section adapted to reduce the pressure to desired level, and pressure reducing devices comprising pressure reducing pump units as further described under FIG. 7.

The converted feed mixture is further separated into at least a gas phase comprising carbon dioxide, hydrogen, carbon monoxide, methane and other short hydrocarbons ($C_2$-$C_4$), alcohols and ketones, a crude oil phase, a water phase with water soluble organic compounds as well as dissolved salts and eventually suspended particles such as inorganics and/or char and/or unconverted carbonaceous material depending on the specific carbonaceous material being processed and the specific processing conditions. Dissolved salts and inorganics include metal or alkali or alkaline earth metals such as aluminium, calcium, magnesium, sodium, potassium, silica, iron, cobalt, nickel, phosphorous. The inorganics originate from the carbonaceous feedstock materials such as biomass and/or from homogenous catalyst(-s) applied in the high pressure production process.

According to a preferred embodiment the separation is performed by a first separation of the individual phases in a phase separator such as a 3-phase separator and subsequently purifying the separated oil phase such as reducing the concentrations of contaminants such as water and/or inorganics e.g. by adding one or more washing agents and/or viscosity and/or density reducing agents and separation of the oil phase from the one or more washing agents and/or acidifying agents and/or viscosity reducing agents in more or more phase separator(-s).

The water phase from the first separator typically contains dissolved salts such as homogeneous catalyst(-s) such as potassium and sodium as well as water soluble organic compounds. Many embodiments of continuous high pressure processing of carbonaceous material to hydrocarbons according to the present invention include a recovery step for recovering homogeneous catalyst(-s) and/or water soluble organics from said separated water phase, and at least partly recycling these to the feed mixture preparation step. Hereby the overall oil yield and energy efficiency of the process is increased. A preferred embodiment according to the present invention is where the recovery unit comprises an evaporation and/or distillation step, where the heat for the evaporation and/or distillation is at least partly supplied by transferring heat from the high pressure water cooler via a heat transfer medium such as a hot oil or steam, whereby the overall heat recovery and/or energy efficiency is increased.

The renewable crude oil may further be subjected to an upgrading process (not shown) where it is pressurized to a pressure in the range from about 20 bar to about 200 bar such as a pressure in the range 50 to 120 bar, before being heated to a temperature in the range 300 to 400° C. in one or more steps and contacted with hydrogen and heterogeneous catalyst(s) contained in one or more reaction zones, and eventually fractionated into different boiling point fractions.

Efficient removal of contaminants such as inorganics in the form of alkali metals such as potassium and sodium, alkali earth metals such as calcium and magnesium and metals such as iron, nickel, cobalt, aluminum, manganese, silicium and phosphorus is critical for the catalyst performance and lifetime, whereas low concentrations of water is important for the overall performance of the upgrading process.

Figure 2:
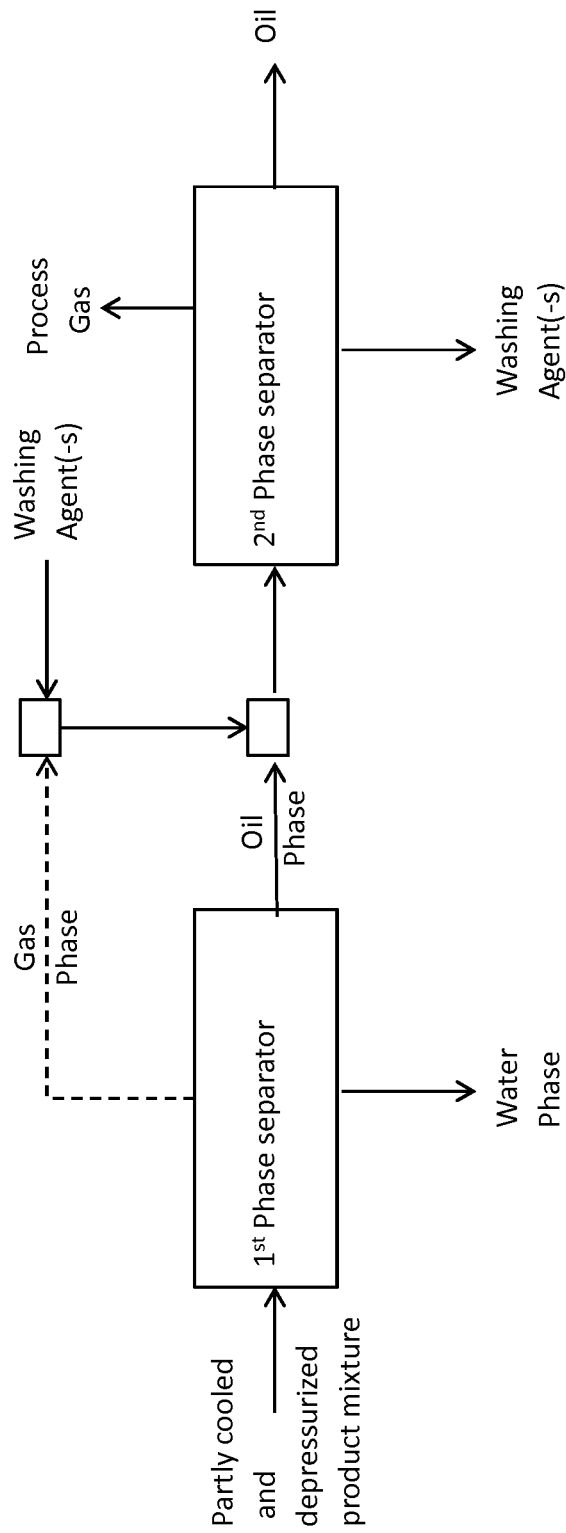
FIG. 2 shows a schematic overview of a first embodiment of a separation system according to the invention.

FIG. 2 shows a schematic overview of a first embodiment of a separation system according to the present invention. The product from the conversion is cooled to a temperature in the range 50° C. to 250° C. such as a temperature in the range 70° C. to 200° C., preferably to a temperature in the range 120° C. to 180° and most preferably to a temperature in the range 130° C. to 170° C., and depressurized to a pressure in the range 10 bar to 150 bar such as to a pressure in the range 10 bar to 100 bar, preferably the product from the conversion is depressurized to a pressure in the range 10 bar to 74 bar such as to a pressure in the range 15 bar to 50 bar, even more preferably to a pressure in the range 20 to 40 bar.

The partly cooled and partly depressurized product stream from the conversion is fed to a first phase separator, where the product from the conversion is separated under pressure into a gas phase, an oil phase, and a water phase and optionally a solid phase depending on the specific carbonaceous material being converted and the specific operating conditions for the conversion process.

Figure 3:
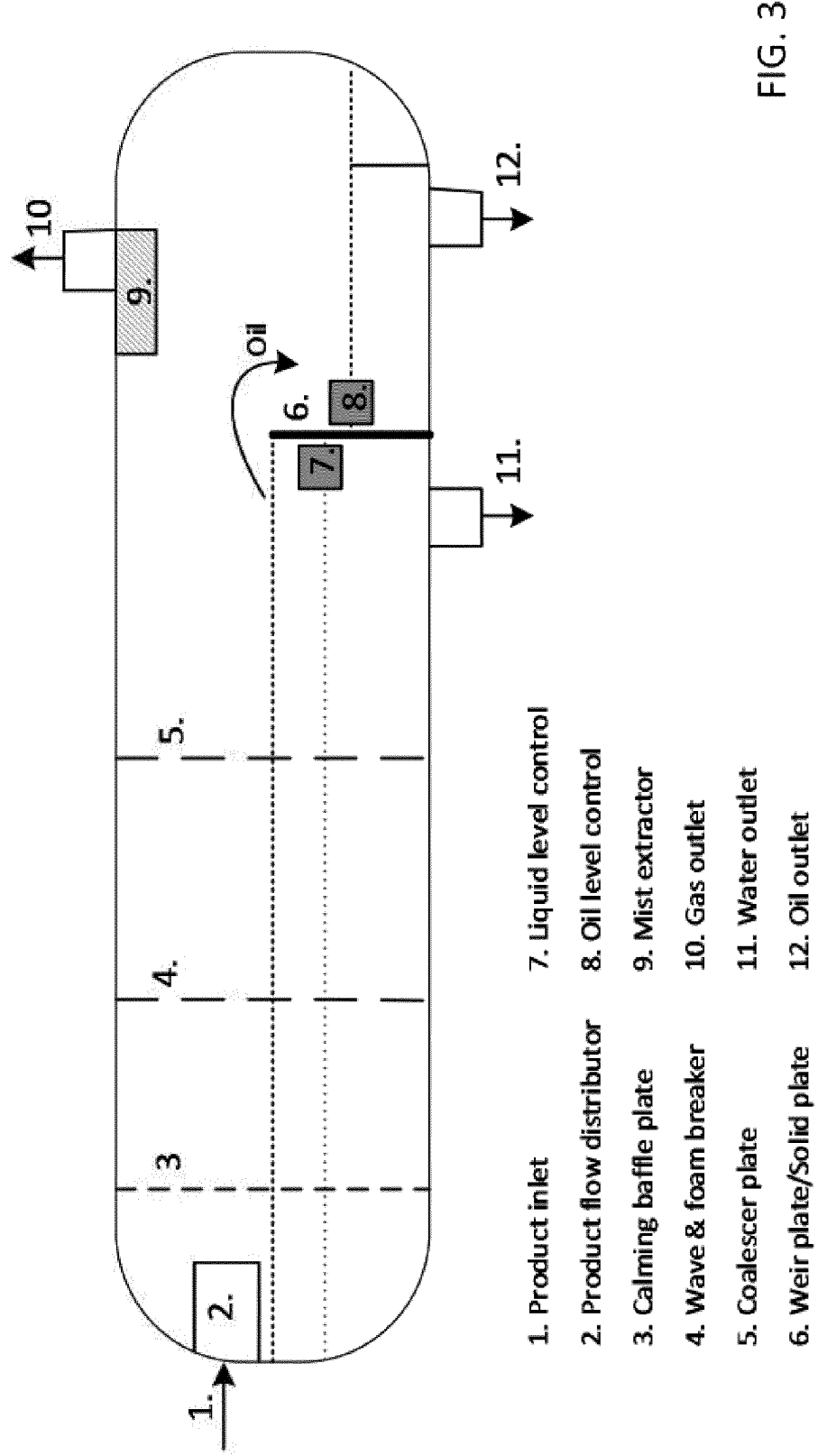
FIG. 3 shows a schematic drawing of preferred embodiment of a 3 phase separator according to the invention.

According to many embodiments of the present invention, the first separator is a gravimetric phase separator as further exemplified in FIG. 3. The phase separator may according to the present invention be horizontally or vertically positioned, however in many preferred applications according to the present invention the first three-phase separator is horizontally positioned. By positioning the phase separator horizontally a larger interphase between the gas and liquids are obtained, so that minimal collision of gas bubbles moving upwards and the liquid droplets going downward is obtained. Hereby a more efficient separation is obtained e.g. the separation efficiency may be increased and/or a shorter residence time may be used.

The first phase separator comprises an inlet for introducing said product mixture, and outlets for withdrawing the gas phase, the oil phase (liquid hydrocarbon), the water phase and optionally a solid phase.

The operating temperature of the first phase separator is in a preferred embodiment selected so as to obtain a dynamic viscosity of the liquid hydrocarbon product in the range from about 0.1 to about 30 centipoise during said separation such as in the range from about 1 to about 20 centipoise during said further separation, preferably the temperature of the separation is selected so as to obtain a dynamic viscosity in the range from about 1 to about 15 centipoise.

The operating temperature of the first phase separation may according to an embodiment of the present invention be in the range 50 to 250° C. such as in the range 80 to 200° C., preferably the operating temperature in the first phase separator is the range 120 to 180° C. such as a temperature in the range 130-170° C. By maintaining the operating temperature of the first separation in specified range it is obtained that the dynamic viscosity of the liquid hydrocarbon product (oil phase) is maintained in the above specified range, thereby improving the separation efficiency of water and/or particles contained in the oil phase.

It has further been found that the oil phase may comprise high organic compounds that have a melting point in the range from about 100 to 120° C. Such organic compounds may comprise high molecular weight compounds such as organic resins and/or asphaltene-like compounds that may solidify on inorganic particles in the oil and/or stabilize the water droplets in the oil phase. Such stabilization may be a result of an interfacial film composed of surface active high-molecular-weight polar solids covering small water droplets and this interfacial film providing a barrier for the droplets to coalesce at too low temperature. By maintaining the operating temperature of the separator sufficiently high (e.g. above the melting point of such compounds), the separation efficiency may be improved by the present invention.

The operating pressure of the first phase separator is according to the present invention generally selected above the saturation pressure of the liquid phase so that the liquid phases are substantially maintained in their liquid state at the prevailing separation temperature. Hence, in many embodiments of the present invention the operating pressure of the first phase separator is at least 10 bar such as an operating pressure of at least 15 bar.

However, it has been found that operation at a higher pressure improves the separation as will be further illustrated under examples of the separation. Hence, an advantageous embodiment of the present invention is where the operating pressure of said first phase separator be in the range 10 to 150 bar, such as in the range 10 to 100 bar, preferably the pressure in the first separator is in the range 10 to 74 bar, such as in the range 15 to 50 bar, and even more preferably in the 20 to 40 bar.

Many aspects of the present invention relate to the use of one or more phase separators, where the residence time in each of the phase separators is in the range 1-30 minutes such as in the range 1 to 20 minutes, preferably the residence time in each of the separators are in the range 2 to 15 minutes such as 2 to 10 minutes.

According to the present invention, the partly dehydrated and partly de-ashed oil phase is withdrawn from the first separator and subjected to a further purification process as shown in the figure.

In an aspect of the present invention part of the oil phase from the first separator is withdrawn prior to the further oil purification and recycled to the feed mixture preparation step of the high pressure process. Hereby the size of the phase separators in the further separation (oil purification) step is reduced.

According to preferred embodiments of the present invention, the oil purification process comprises mixing the oil phase with one or more washing agents and subsequently feeding the mixed oil phase and washing agent to a further separation step comprising one or more phase separators, where it is separated into a phase comprising at least one washing agent and having an increased content of water and/or inorganics and an oil phase having a reduced inorganic and/or water content, and optionally a gas phase.

The operating pressure of the one or more separators in the further separation step is according to advantageous embodiments of the present invention in the range 10 to 150 bar, preferably the pressure in the first separator is in the range 10 to 100 bar, such as in the range 15 to 50 bar, and even more preferably in the range 20 to 40 bar.

The operating temperature of the one or more phase separators in the further separation step may according to an embodiment of the present invention be in the range 50 to 250° C. such as in the range 80 to 200° C., preferably the one or more phase separators is operating at a temperature in the range 120 to 180° C. such as a temperature in the range 130-170° C. By maintaining the operating temperature of separation in the specified range it is obtained that the dynamic viscosity of the liquid hydrocarbon product (oil phase) is maintained in the above specified range, thereby improving the separation efficiency of water and/or particles contained in the oil phase.

In many aspects of the present invention, the washing agent may comprise a viscosity and/or density reducing agent. The viscosity and/or density reducing agent may be an organic solvent having a boiling point below 150° C. such as below 140° C., preferably below 130° C.

A preferred embodiment is where the viscosity and/or density reducing agent(-s) comprises one or more ketones such as and/or acetone, and/or propanones, and 2-heptanone and/or buthanones such as Methyl Ethyl Ketone (MEK) and/or pentanones, and or pentenones and/or cyclopentanonees such as 2,5 dimethyl-cyclo-pentanone and/or hexanones and/or hexanones such as 3,3-methyl hexanones and/or cyclohexanones and/or heptanones, and/or one or more alcohols such as methanol, ethanol, propanol, isopropanol buthanol, isobutanol and/or one or more aromatic compounds such as toluene, xylene, cumene, ethyl benzene, 1,2,4 trimethyl benzene, 1,3,5 trimethyl benzene, 1,2,3 trimethyl benzene and/or one or more alkanes such as pentanes, hexanes, heptanes, octanes, nonanes, decanes, dodecanes or a combination thereof.

A particularly preferred embodiment is where the viscosity and/or density reducing agent(-s) comprises one or more ketones in a concentration in the range 30-60% by weight, and one or more alcohols in a concentration in the range 5-30% by weight, and one or more aromatics in a concentration in the range 10 to 40% by weight, and one or more alkanes in the concentration in the range 10 to 30% by weight.

Advantageously the viscosity and/or density reducing agent comprises a fraction of the oil phase and is recovered downstream of said further separation step and prior to providing the renewable crude oil to an optional upgrading step.

According to a preferred embodiment of the present invention the viscosity and/or density reducing agent is recovered in an evaporation step such as flash separation and/or distillation step operating at a temperature in the range 100-200° C. such as in the range 100-160° C., preferably the viscosity reducing agent is recovered in an evaporation step operating at a temperature in the range 100-150° C. such as in the range 100-130° C.

A particular preferred embodiment of the present invention is where the viscosity and/or density reducing agent is substantially recovered in one or more flash distillation step(-s) producing an oil phase and a distillate phase, and where the flash temperature is in the range 100-200° C. such as in the range 100-160° C., preferably the viscosity and/or density reducing agent is recovered in the flash distillation step producing an oil phase and a distillate phase, where the flash temperature is in the range 100-150° C. such as in the range 100-130° C.

Particularly preferred viscosity and/or density reducing agents according to the present invention is a low boiling point fraction of the oil from the converted feed mixture such as fraction having boiling points below 160° C.; preferably a fraction of the oil from the converted feed mixture having a boiling point below 140° C., such as boiling points below 130° C.

The weight ratio of the viscosity and/or density reducing agent added to the amount of oil are in the range 0.01 to 2 such as in the range 0.2 to 0.4 such as in the range 0.2 to 0.35.

The viscosity and/or density reducing agent reduces the viscosity of the oil phase and may also reduce the density of the oil phase. Further, the viscosity and/or reducing agent may improve dissolution of organic particles and/or improve the hydrophobicity of the oil phase. Hereby, the separation efficiency is improved and/or the required separation time may be reduced.

In an aspect of the present invention the one or more washing agents comprise or further comprises an emulsion breaker.

A preferred embodiment is where said emulsion breaker comprises one or more solvents selected from the group of water, xylenes, ethanol, methanol, butanol, propanol, toluene, phenol-formaldehyde resin, heavy and light aromatic naphtha, ethylbenzene, 1,2,4 trimethylbenzene, 1,3,5 trimethylbenzene, 1,2,3 trimethylbenzene, glutaraldehyde, 2-butanone, ethyl acetate, 1-propyl acetate, polymers of ethylene oxide, pentylamine, butyl acrylate.

An advantageously embodiment is where said emulsion breaker comprises a mixture of three or more solvents.

The concentration of the emulsion breaker and/or is typically in the range of 100 to 20000 ppm, such as in the range of 150 to 8000 ppm, thus in the range of 150-7000 ppm, preferable in the range of 150-5000 ppm.

In many embodiments of the present invention at least one of the washing agents comprises water. Further an advantageous embodiment according to the present invention is where at least one acidifying agent is added to the at least one washing agent comprising water. Suitable acidifying agents according to the present invention includes acetic acid and/or citric acid. Typically said acidifying agent is added in an amount so that the pH of the separated pressurised washing agent from the second separator is in the range from about 2 to about 7 such as a pH in the range from about 3 to about 6.5; preferably the pH of the separated washing agent is in the range from about 3 to about 6 such as a pH in the range from about 3 to about 5. By reducing the pH to the specified ranges according to the present invention it is obtained that compounds such as potassium and sodium that may be bound to acidic groups of the oil as soaps are dissolved. Further the solubility of metals are also increased by reducing the pH. Still further at too low pH it has been found that stable emulsions may be formed.

A particularly preferred embodiment of the present invention is where the acidifying agent comprises pressurized gas produced by the conversion process of the carbonaceous material. The process gas typically comprises carbon dioxide as well as some light hydrocarbon gasses such as methane, ethane, ethene, propane, propene, butane, butene, pentane as further exemplified in example 1. Typically said process gas is withdrawn from the first separator as shown in the figure and at least partly mixed with the washing agent(s) e.g. in an inline mixer such as a static mixer prior to being introduced into the subsequent phase separator of the further separation step. At the operating pressures of the one or more phase separators in the further separation according to the present invention, $CO_2$ dissolves into the water phase and forms carbonic acid whereby the water is acidified to a pH in the range 3 to 4. Further at operating conditions according to an embodiment of the present invention, the light hydrocarbon gases mentioned above may be dissolved in the oil phase whereby a reduced oil viscosity and/or reduced density of the oil phase and/or improved hydrophobicity of the oil phase is obtained. Hereby the separation efficiency is improved as further exemplified in examples. A further advantage of using the process gas as acidifying agent is that it is easily separated from the oil product and/or washing agent upon reduction of pressure to ambient, which makes the further processing of these streams easier.

FIG. 3 shows a schematic drawing of a preferred embodiment of a phase separator according to the invention. The product mixture enters the phase separator through a product inlet (1), preferably positioned in the free board above liquid level at one end of the separator. The product mixture inlet is preferably equipped with a diverter or distributor (2) such as a diffuser to reduce fluid momentum and separate gas from the liquids, whereby a more efficient gas-liquid separation is obtained. In other aspects of the present invention the product inlet may comprise or further comprise cyclones or cyclone clusters (2). In an alternative embodiment gas may be separated from the residual product stream prior to entering the phase separator and the residual product stream may be introduced to the separator via a dip leg (not shown).

In many preferred embodiments the phase separator is further equipped with flow distribution, wave and foam breaking means such as perforated baffles (3), lamella plates (4) or a mesh to calm the flow as shown on the figure. A phase separator according to the present invention may in further aspects further comprise coalescing means (5) such as a mesh, lamella plates and/or electro-coalescing means to speed up the coalescing process, whereby a more efficient separation of the phase is obtained.

A phase separator according to embodiments of the present invention typically further comprises one or more weir plate(-s) (6) to separate the liquid phases. Often an overflow of the oil phase is present as indicated in the figure.

The gas is typically withdrawn from an outlet (10) in the opposite end of the inlet and often passes a demister or mist extractor (9) to remove droplets before being withdrawn from the separator as shown in the figure. Preferred demisting means (9) according to the present invention includes mesh's, serpentine vanes and cyclones.

A phase separator according to the present invention is typically further equipped with means to measure and control the level of water phase (7) and the level of the oil phase (8).

The water phase is withdrawn via the water outlet (11) and the oil phase is withdrawn through the oil product outlet (12). Both outlets are typically equipped with vortex breakers to keep vortexes from developing when valves are opened. A vortex could potentially suck some gas from the vapour space and reentrain in the liquid outlet.

A phase separator according the present invention may further be equipped with means for removing solids (not shown). Said means may according to an embodiment of the invention comprise a jetting system to fluidize the solids and a drain system to remove the fluidized solids.

Figure 4:
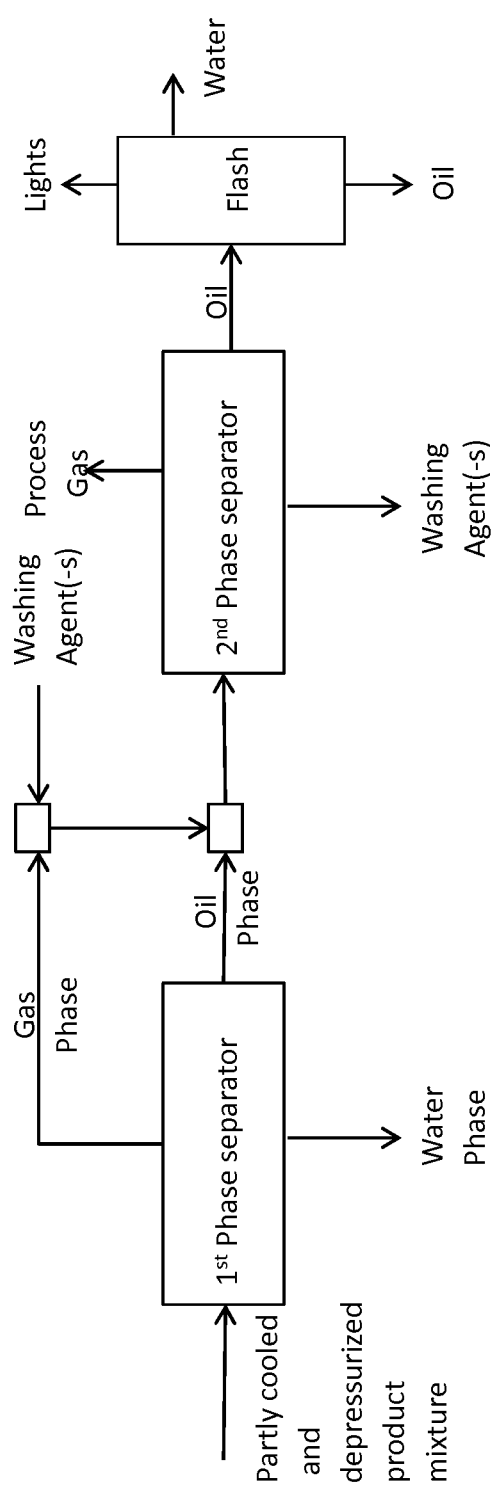
FIG. 4 shows a schematic overview of another embodiment of a separation system according to the invention, further comprising a flash separator for recovering low boiling compounds and water from the oil phase after the second phase separator.

FIG. 4 shows a schematic overview of another embodiment of a separation system according to the invention further comprising a flash separator for recovering low boiling compounds and water from the oil phase after the one or more phase separators in the further separation step. Typically the flash separator is operated at a temperature in the range 80 to 150° C.; preferably in the range 100 to 140° C. such as in the range 110 to 130° C. The pressure of the oil product is typically reduced to close to ambient prior to entering said flash separator whereby the oil product is split into 1. A gas phase comprising process gas, low boiling compounds of the oil ("lights"), water and eventually viscosity and/or density reducing agents, 2. An oil phase comprising the dehydrated and de-ashed oil product. The gas from the flash separator is cooled to condense the condensable part of the gas phase like water, the low boiling fraction of the oil and/or viscosity and density reducing agent and is further separated from the noncondensable part of the gas. The condensable part of the gas may be further separated into a water phase and an organic/light phase e.g. by gravimetric phase separation. Both the water phase and the organic phase may according to the present invention be recycled as washing agents as further illustrated in FIG. 6. Further part of the organic (light) phase may according to an embodiment of the present invention be remixed with the oil product as further described under FIG. 6. Hence, by the flash separation according to the present invention it is obtained that washing agents can be recovered and/or the water content in the oil can be further reduced, whereby a more economical and effective separation system is obtained.

Figure 5:
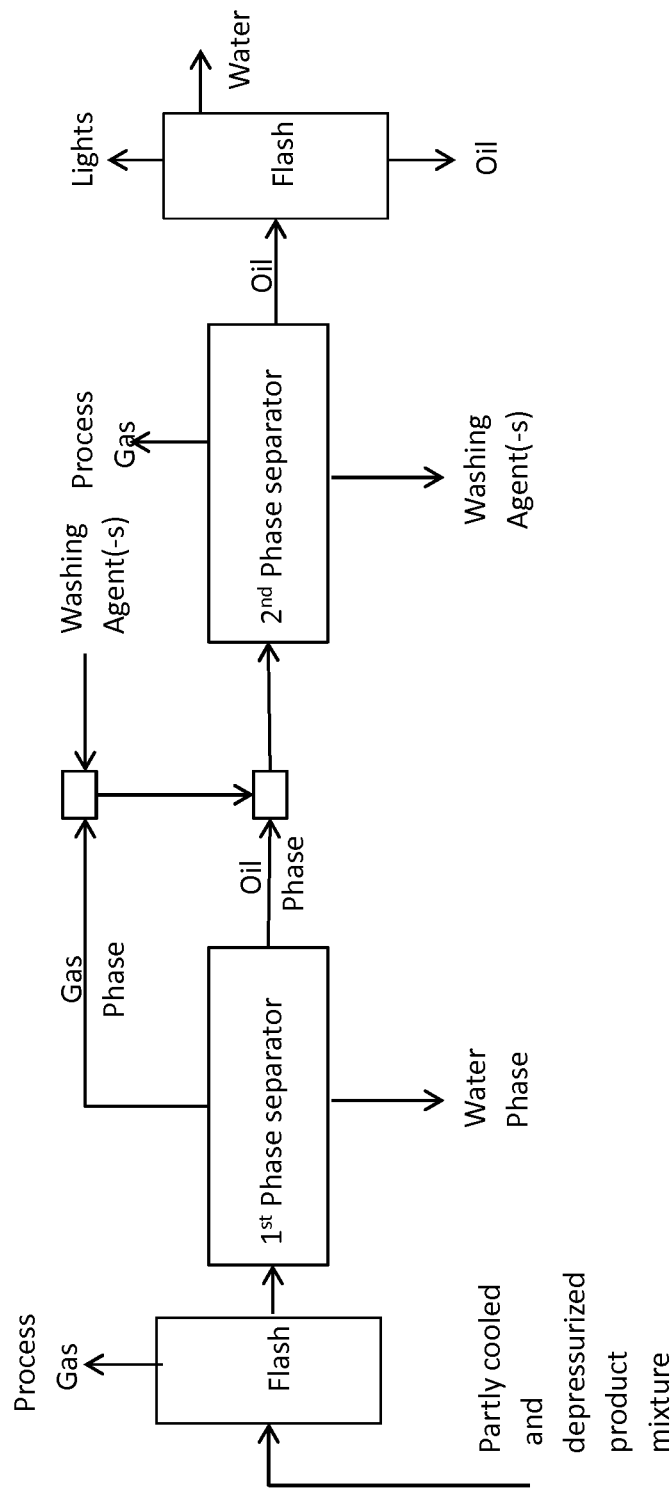
FIG. 5 shows a schematic overview of a preferred embodiment of a separation system according to the invention further comprising a flash separator to separate gas from the converted feed mixture prior to entering the first phase separator.

FIG. 5 shows a schematic overview of a preferred embodiment of a separation system according to the invention further comprising a flash separator or degasser to separate gas from the converted feed mixture prior to entering the first phase separator. The flash separator or degasser according to the present invention may in some embodiments operate at a higher pressure than the subsequent phase separators such as a pressure in the range 50 to 150 bar, whereby at least part of the process gas may be recovered at a higher pressure than in the down-stream phase separators thereby allowing for easier recovery of carbon dioxide and/or hydrogen from said gas stream as further described under FIG. 7. Further by operating said flash separator/degasser at a higher pressure than the downstream phase separators, the cost of the phase separators may be reduced.

Figure 6:
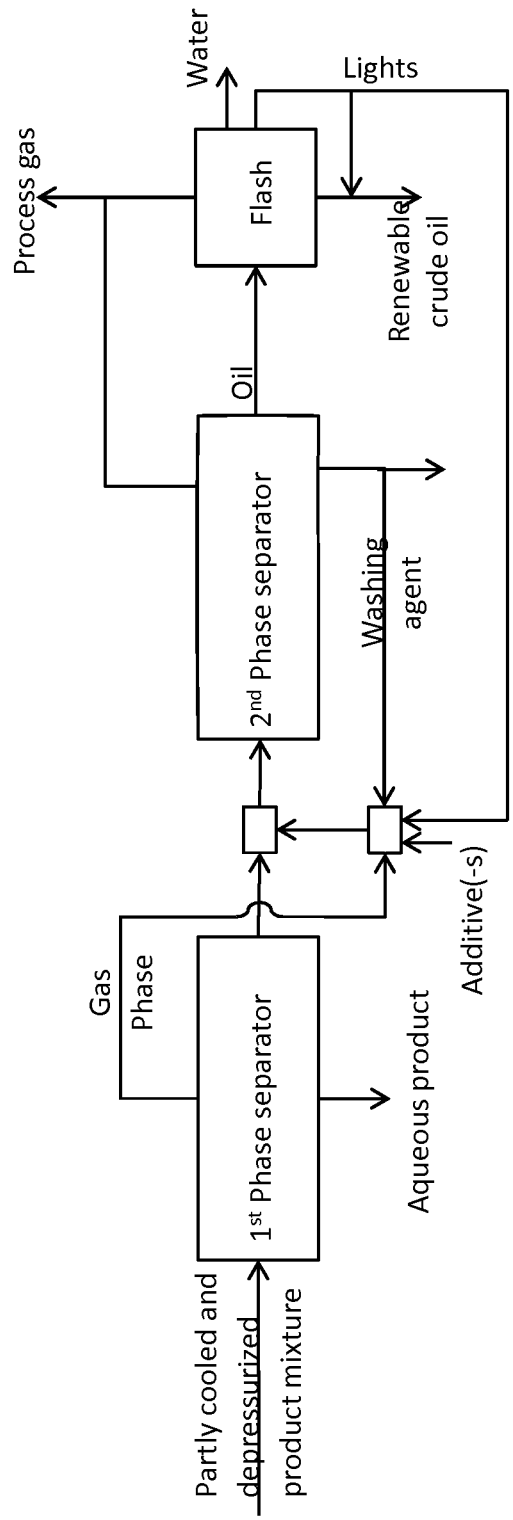
FIG. 6 shows a schematic overview of an advantageous embodiment of a separation system according to the invention.

FIG. 6 shows a schematic overview of an advantageous embodiment of a separation system according to the invention. The separation system comprises a first phase separator for separation of the product stream into a gas phase, an oil phase and a water phase containing dissolved salts and water soluble organics. The oil phase from the first separator is further purified by mixing it with one or more washing agents prior to entering each of the one or more phase separators of the further separation step as described above under FIG. 1-5. As shown in the figure an advantageous embodiment of the present invention is where the separated washing agent(-s) from the one or more phase separators in the further separation step and/or recovered "lights" from the flash separator is at least partly recycled and mixed with the oil prior to entering each of the separators in the further separation. The lights may constitute one or more viscosity and/or density reducing agents as described above. Further additives such as make up washing agent(s) an/or de-emulsifiers may be added and mixed with the oil phase as indicated on the drawing.

FIG. 7 shows a schematic overview of an advantageous embodiment of a high pressure process adapted for processing a feed stream comprising carbonaceous material and an advantageous separation system according to the invention.

1. Preparation of Feed Mixture

The first step of the process is to prepare a feed mixture in the form of pumpable slurry of the carbonaceous material. This generally includes means for size reduction and slurrying such as dispersing the organic matter with other ingredients such as water, catalysts and other additives such as organics in the feed mixture, A carbonaceous material according to the present invention may be in a solid form or may have a solid appearance, but may also be in the form of a sludge or a liquid. Further the carbonaceous material(-s) may be contained in one or more input streams.

Non limiting examples of carbonaceous feedstock according to the present invention include biomass such as woody biomass and residues such as wood chips, saw dust, forestry thinnings, road cuttings, bark, branches, garden and park wastes & weeds, energy crops like coppice, willow, miscanthus, and giant reed; agricultural and byproducts such as grasses, straw, stems, stover, husk, cobs and shells from e.g. wheat, rye, corn rice, sunflowers; empty fruit bunches from palm oil production, palm oil manufacturers effluent (POME), residues from sugar production such as bagasse, vinasses, molasses, greenhouse wastes; energy crops like miscanthus, switch grass, sorghum, jatropha; aquatic biomass such as macroalgae, microalgae, cyano bacteria; animal beddings and manures such as the fiber fraction from livestock production; municipal and industrial waste streams such as black liquor, paper sludges, off spec fibres from paper production; residues and byproducts from food production such as pomace from juice, vegetable oil or wine production; municipal solid waste such as sorted municipal solid waste, source sorted household wastes, restaurant wastes, slaughter house waste, sewage sludge, plastics, bitumen, lignite coal and combinations thereof.

Many carbonaceous materials according to the present invention are related to lignocellulose materials such as woody biomass and agricultural residues. Such carbonaceous materials generally comprise lignin, cellulose and hemicellulose.

An embodiment of the present invention includes a carbonaceous material having a lignin content in the range 1.0 to 60 wt. % such as lignin content in the range 10 to 55% wt. %. Preferably the lignin content of the carbonaceous material is in the range 15 to 40 wt. % such as 20-40 wt. %.

The cellulose content of the carbonaceous material is preferably in the range 10 to 60 wt. % such as cellulose content in the range 15 to 45% wt. %. Preferably the cellulose content of the carbonaceous material is in the range 20 to 40 wt. % such as 30-40 wt. %.

The hemicellulose content of the carbonaceous material is preferably in the range 10 to 60 wt. % such as cellulose content in the range 15 to 45% wt. %. Preferably the cellulose content of the carbonaceous material is in the range 20 to 40 wt. % such as 30-40 wt. %.

Depending on the specific organic matter being transformed and how it is received, the size reduction may be conducted in one or more steps e.g. the carbonaceous material may be treated as is and subsequently mixed with other ingredients in the same step or it may pre-grinded to a size suitable for further processing and size reduction in the mixing step. Often the carbonaceous material is size reduced to a particle size less than 5 mm such as a particle size of less than 3 mm; preferably to a particle size of less than 2 mm such as less than 1 mm.

The pre-grinding may according to an embodiment of the present invention be performed using a shredder, cutting mill, hammer mill, pan grinder, impeller mill or a combination thereof.

Advantageously the pre-grinding step may further comprise means for removal of impurities such as metals, stones, dirt like sand, and/or to separate off spec fibers from the carbonaceous material with particle size with said maximum size. Such means may comprise magnetic separation, washing, density separation such as flotation, vibration tables, acoustic separators, sieving and combinations thereof. Said means may be present prior to the pre-grinding step and/or after the pre-grinding step.

The carbonaceous material is subsequently mixed with other ingredients of the feed mixture. Other ingredients may include:

1. Recycled oil (hydrocarbons) produced by the process or a fraction of the oil (hydrocarbon produced by the process; preferably in a weight ratio to dry ash free organic matter in the range 0.5 to 1.5 such as a ratio 0.8 to 1.2; The recycled oil may comprise phenols, alkylated phenols, polyphenols, monomeric and oligomeric phenols, creosol, thymol, alkoxy phenols, p-coumaryl alcohol, coniferyl alcohol, sinapyl alcohol, flavenols, catechols.

2. Recycled concentrate of the water phase from the process comprising recovered homogeneous catalyst and water soluble organics such as one or more components selected from a. Ketones such as acetone, propanones, butanones, penthanones, penthenones, cyclopentanones such as 2,5 dimethyl cyclopentanone, cyclopentenones, hexanones and cyclohexanones such as 3-methyl hexanone, quionones etc.

b. Alcohols and poly-alcohols such as methanol, ethanol, propanols (incl isopropanol), buthanols, penthanols, hexanols, heptanols, octanols such as 2-butyl-1-octanol, hydroquinones, benzene diols etc.

c. Phenols, alkylated phenols, poly-phenols, monomeric and oligomeric phenols, creosol, thymol, alkoxy phenols, p-coumaryl alcohol, coniferyl alcohol, sinapyl alcohol, flavenols, catechols d. Carboxylic acids such as formic acid, acetic acid and phenolic acids like ferric acid, benzoic acids, coumarin acid, cinnamic acid, abietic acid, oleic acid, linoleic acid, palmitic acid, stearic acid e. Furans such as THF etc.

f. Alkanes, alkenes, toluene, cumene etc.

and combinations thereof.

In general the water soluble organics constitute a complex mixture of the above and the feed mixture may comprise such water soluble organics in a concentration from about 1% by weight to about 10% by weight such as in the range from about 2% by weight to about 5% by weight.

3. Make up homogeneous catalyst in form a potassium carbonate and/or potassium hydroxide and/or potassium acetate; preferably added in the form of an aqueous solution and added in an amount so that the total concentration of potassium in the resulting feed mixture is at least 0.5% by weight such as a concentration in the feed mixture of at least 1.0% by weight; preferably the concentration of potassium is at least 1.5% by weight such as at least 2.0% by weight;

4. Make up base for pH adjustment. Preferably sodium hydroxide is added to the feed mixture in an amount so as the pH measured in the recycled water phase is above 7 and preferably in the range 8.0 to 12.0 such as in the range 8.0 to 10.0.

The ingredients 1.-4. are preferably all on a liquid form and may advantageously be premixed and optionally preheated, before being mixed with the organic matter to produce said feed mixture. Premixing and/or preheating may reduce loading time and heating time required in the mixer.

The mixing of the carbonaceous material and other ingredients are mixed so as to form a homogeneous slurry or paste. Said mixer may according to the present invention be a stirred vessel equipped with means for efficiently mixing, dispersing and homogenizing viscous materials such as a planetary mixer, Kneader or Banbury mixer. The mixer is preferably further equipped with means for preheating said feed mixture to a temperature in the range 80 to 220° C., preferably in the range 130 to 200° C. and more preferably in the range 150 to 180° C. at a sufficient pressure to avoid boiling such as a pressure in the range 1-30 bar, preferably in the range 4-20 bar such as in the range 5-16 bar. Preheating the feed mixture to temperatures in the above ranges results in a softening and/or at least partial dissolution of the carbonaceous thereby making the feed mixture easier to size reduce and homogenize. In an advantageous embodiment the preheating is combined with an expansion, whereby a further size reduction due to a steam explosion of the internal moisture content is obtained. Said expansion or steam explosion may in some preferred embodiments be performed prior to mixing the carbonaceous material with other ingredients.

Preferred means for heating said feed mixture during the preparation according to the present invention include a heating jacket. In a preferred embodiment the heat for preheating said feed mixture is obtained from the cooling of the converted carbonaceous material comprising liquid hydrocarbon product e.g. by use of a heat transfer medium for extraction of heat from the high pressure water cooler to a heat transfer medium and for distribution of heat as described in further details above in relation to FIG. 3-FIG. 5. Hereby the energy efficiency of the process may be further enhanced. The mixer may further be equipped with a re-circulation loop, where material is withdrawn from said mixer and at least partly re-circulated in an internal or external loop and re-introduced into said mixer so as to control the feed mixture characteristics e.g. rheological properties such as viscosity and/or particle size to a pre-defined level. The external loop may further comprise one or more size reduction and/or homogenization device(-s) such as a macerator and/or a colloidal mill and/or a cone mill and/or a stone mill or a combination thereof in a series and/or parallel arrangement.

Preferably, the carbonaceous material is fed to the mixer gradually rather than at once, to control the viscosity of the feed mixture and that feed mixture remains pumpable, while being size reduced and homogenized. The control of the viscosity may in an advantageous embodiment be performed by measuring the power consumption of the mixer and/or colloidal mill and adding organic matter to the feed mixture according to a predefined power consumption. It is further advantageous not to empty the mixer completely between batches as the prepared feed mixture acts as a texturing agent for the next batch and thereby assists in homogenizing the next batch by making it more pumpable, and thereby the carbonaceous material may be added faster.

Other preferred means for thoroughly mixing and homogenizing the ingredients in the feed mixture include inline mixers. Such inline mixers may further introduce a cutting and/or a scissoring and/or a self-cleaning action. A preferred embodiment on such inline device includes one or more extruders.

The feed mixture from the feed mixture mixing step may be fed to a holding tank before entering the pressurization step of the process. Said mixing tank may be equipped with means for agitating said feed mixture in the holding tank and/or circulation means for circulating said feed mixture around said holding tank whereby the feed mixture is maintained in a shear thinned and easier to pump state. Optionally the feed mixture may be expanded before entering the holding tank, whereby the feed mixture may be further size reduced and homogenized.

Typically the dry matter content of carbonaceous material in the feed mixture according to the present invention is in the range 10 to 40% by weight, preferably in the range 15 to 35% and more preferably in the range 20 to 35% by weight.

The process according to the present invention requires water to be present in said feed mixture. Typically the water content in said feed mixture is at least 30% by weight and in the range 30 to 80% by weight and preferably in the range 40 to 60%.

2. Pressurization

The second step of an advantageous embodiment of a high pressure process according to the present invention is pressurization to the desired pressure for said conversion process. According to the present invention said pressurization to the desired reaction pressure is essentially performed before heating from entry temperature from the feed mixture preparation step to the reaction temperature in the high pressure water heating cooling system is initiated.

Typically the feed mixture is pressurized to an operating pressure during said heating and conversion of at least 150 bar such as 180 bar, preferably said operating pressure is at least 221 bar such as at least 250 bar and more preferably said operating pressure during conversion is at least 300 bar. Even more preferably the operating pressure is in the range of 300-400 bar such as in the range 300-350 bar.

Many embodiments according to the present invention relates to processing of feed mixtures with a high content of carbonaceous material as described above. Such feed mixtures typically have densities in the range 1050 to 1200 kg/m$^3$, and typically behaves as a homogeneous pseudoplastic paste rather than a suspension of discrete particles (liquid). The viscosity of such pastes may vary widely with shear rate due to the pseudoplastic (shear thinning) behavior and may be in the $10^3$ to $10^7$ cP depending of the specific shear rate and carbonaceous material being treated.

An aspect of the present invention relates to a pressurization system for pressurizing such highly viscous pseudoplastic feed mixtures. According to a preferred embodiment of the present invention, the pressurization system comprises two or more pressure amplifiers each comprising cylinders with a piston equipped with driving means for applying and/or receiving a force to the piston. Advantageous driving means for the pistons in the cylinders according to the present invention include hydraulically driven means.

In an advantageous embodiment pressure energy is recovered in the pressure reduction step described below under step 6. Pressure reduction, and transferred to an energy absorption reservoir, where the energy absorbed by the pressure reducing device is transferred to the reservoir for successive utilization in e.g. the pressurization step. Thereby a very energy efficient high pressure process is obtained.

3. Heating

The pressurized feed mixture is subsequently heated to a reaction temperature of at least 300 and up to about 450° C. such as in the range 340 to 430° C., preferably in the range 350 to 430° C. such as in the range 370 to 420° C., more preferred in the range 385 to 420° C. such as in the range 400 to 415° C.

According to the present invention, the heating of the feed mixture is performed by indirect heat exchange with high pressure water. By use of such heat transfer medium it is obtained that both the feed mixture and the product mixture may flow inside tubes thereby allowing for easier cleaning.

By said heat recovery it is obtained that the process becomes very energy efficient as most of the heat required is recovered. In many embodiments of the present invention at least 40% of the energy required to heat the feed mixture to the desired reaction temperature is being recovered such as at least 50% of the energy required to heat the feed mixture to the desired reaction temperature is being recovered. Preferably, at least 60% required to heat the feed mixture to the desired reaction temperature is recovered such as at least 70% of the energy required being recovered.

4. Reaction

Subsequent to heating to reaction temperature said pressurized and heated feed mixture is maintained at the desired pressure and temperature in a reaction zone c. for a predefined time. The feed characteristics and/or the combination of pressure and temperature according to the present invention generally allow for shorter reaction times and/or a more reacted liquid hydrocarbon product than in the prior art without sacrificing the yield and/or quality of the desired product. The predefined time in said reaction zone may according to an embodiment of the present invention be in the range 1 to 60 minutes such as 2 to 45 minutes, preferably said predefined time in said reaction zone is in the range 3 to 30 minutes such as in the range 3 to 25 minutes, more preferred in the range 4 to 20 minutes such as 5 to 15 minutes.

5. Cooling

The outlet stream from the reactor comprising liquid hydrocarbon product, water with water soluble organics and dissolved salts, gas comprising carbon dioxide, hydrogen, and methane and eventually suspended particles from the converted carbonaceous material, enters the cooler (6), where it is cooled by contact with high pressure water from the high pressure water cooler.

Typically the inlet temperature of the high pressure water to the product mixture cooler (6) is at least 60° C. such as at least 80° C.; preferably the inlet temperature of the high pressure water to the product mixture cooler (6) is at least 100° C. such as at least 110° C. In many embodiments according to the present invention, the inlet temperature of the high pressure water to the product mixture cooler (6) is in the range 100° C. to 150° C. such as in the range 110-140° C.

Often the product mixture is cooled to a temperature in the range 80° C. to 250° C. in the cooler (6) such as in the range 100 to 200° C.; preferably the is cooled to a temperature in the range 120° C. to 180° C. such as to a temperature in the range 130° C. to 170° C. by heat exchange with the product mixture in the heat exchangers.

A preferred embodiment of the present invention is where said heat exchange is performed by indirect heat transfer with high pressure water. By use of such indirect heat transfer via a heat transfer medium it is obtained that both the feed mixture and the product mixture can flow inside tubes thereby allowing for easier cleaning. The heat transfer medium may optionally be further heated and/or be further cooled so as to allow for added controllability and flexibility of the heating and cooling. Said heat transfer medium may also be used for transfer of heat to/from other unit operations of the process such as e.g. the pre-treatment 1 and/or the upgrading part of a process according to the present invention.

6. Pressure Reduction

The cooled product enters a pressure reducing device, where the pressure is reduced from the conversion pressure to a pressure of less than 200 bar such as a pressure of less than 120 bar. Preferably the pressure is reduced to less than 90 bar such as less the 80 bar. More preferably the pressure is reduced to less than 50 bar such as a pressure in the range 10 bar to 40 bar.

Suitable pressure reduction devices include pressure reduction devices comprising a number of tubular members in a series and/or parallel arrangement with a length and internal cross section adapted to reduce the pressure to desired level.

In a preferred embodiment the cooled product mixture enters a pressure reducing device, where the pressure reduction unit comprises at least one inlet and an outlet, the pressure reduction unit being adapted to receive a pressurized fluid at process pressure level at the inlet, being adapted to isolate the received pressurized fluid from the upstream process and from the outlet and being adapted to reduce the pressure of the fluid to a lower predetermined level and further being adapted to output the fluid through the outlet while still isolated towards the upstream process.

In general pressure reduction unit comprises an actuated valve at the inlet and an actuated valve at the outlet and between the inlet valve and the outlet valve a pressurization device. Further a pressure reduction unit according to an embodiment of the present invention comprises means for measuring the pressure upstream the inlet valve, between the inlet valve and the outlet valve and downstream the outlet valve.

The pressure reduction unit according to the present invention may further comprise a pump unit having a cylinder and a piston as well as means for driving the piston inside the cylinder. Advantageously the pressure reduction unit further comprises a position indicator indicating the cycle position of the pressure reduction device and being adapted to provide a control signal for opening or closing at least one valve in the pressure reduction system.

An advantageous embodiment of a pressure reduction device according to the present invention is where the pressure reduction pump is connected to a further pump that drives a pressurization of the energy absorption reservoir. For example the pressure reduction device further comprising an energy reservoir, where the pressurization pump is operatively connected to the reservoir and where the energy absorbed by the pump is converted and transferred to the pressurization pump.

In a preferred embodiment, the energy reservoir drives a pressurization pump adapted to pressurize the feed mixture in the pressurization step (step 2 above) of the high pressure process. In one embodiment of the present invention, this is performed by a low pressure turbine connected to a generator generating electrical energy, and the electricity generated reduces the energy required to drive the pressurization pump in the pressurization step.

The pressure reducing device according to the present invention are typically designed for low stroke speeds (large stroke volume) thereby allowing for the use of actuated valves for filling and emptying of the cylinders rather than check valves. Preferred actuated valves according to the present invention include gate valves and ball valves or a combination thereof.

The stroke speed of the pistons according to an embodiment of the present invention may be from about 1 stroke per minute up to about 150 strokes per minute such as from about 5 strokes per minute up to about 100 strokes per minute. Preferably the stroke speed of the pistons are from about 10 to about 80 strokes per minute such as a stroke speed of the piston in the range 20 strokes per minute to about 60 strokes per minute. Besides allowing for the use of actuated valves the low stroke speed of the piston reduces the wear on pistons, seals and valve seats.

The inlet temperature to the pressure reduction device is generally in the range from about 10° C. to about 250° C. such as from about 20° C. to about 220° C.; preferably the inlet temperature to the pressure de-amplifying cylinders is in the range from about 50° C. to about 210° C. such as from about 80° C. to about 200° C.; even more preferably the inlet temperature to the pressure de-amplifying cylinders is in the range from about 100° C. to about 180° C. such as from about 120° C. to about 170° C.

For applications according to the present invention, where the temperature exceeds about 120° C. such as about 140° C., the cylinders may further be equipped with means for cooling the seals of piston in order to withstand the operating conditions.

7. Separation

The partly cooled and depressurized mixture from said pressure reduction containing liquid hydrocarbon product mixture is subsequently led to a separation system according to the present invention. For some carbonaceous materials such as carbonaceous materials comprising high inorganic contents, the partly cooled and partly depressurized product stream from the conversion may be filtered to remove solids before entering separation and oil purification section of the high pressure process.

Further in some preferred embodiments a washing agent may be added to the product stream before entering the first phase separator. The washing agent may according to preferred aspects of the present invention comprise water. It should be noted that adding such washing agent may increase the volume flow from the separator thereby increasing the size of downstream equipment (e.g. 8. recovery unit). However, advantageous embodiments according to the present invention include adding an alkaline washing agent such as a base comprising sodium hydroxide, potassium hydroxide, sodium carbonate, potassium carbonate or a combination thereof to the product stream before entering the first phase separator so that an alkaline wash of the oil is obtained in the first separator. The base is preferably preheated before being added to avoid cooling of the incoming product stream. By adding such base to the first separator the separation efficiency is improved for some applications. In some applications, the base being added to the production from the conversion stream prior to entering the first separator may replace the make-up base being added to the feed mixture for pH control in preferred embodiments of the present invention as described under 1. Preparation of feed mixture above. By adding the make-up base at this position instead of in the feed mixture preparation the separation efficiency may be improved and/or the pH of mixed effluent stream of water phase and washing agent whereby recovery of homogeneous catalyst(-s) and water soluble organics in the recovery unit described below may be easier.

In a further aspect of the present invention a viscosity and/or density reducing agent may be added to the converted feed mixture prior to entering the first phase separator. The viscosity and/or density reducing agent may often be an organic solvent having a boiling point below 200° C. such as below 150° C., preferably below 140° C. such as below 130° C. By adding such viscosity and/or density reducing agent the separation efficiency may be improved.

Suitable viscosity and/or density reducing agent(-s) according to the present invention are organic solvent(-s) having a boiling point below 150° C., preferably below 140° C. such as below 130° C. Such viscosity reducing agents according to the present invention comprises one or more ketones such as and/or acetone, and/or propanones, and 2-heptanone and/or buthanones such as Methyl Ethyl Ketone (MEK) and/or pentanones, and or pentenones and/or cyclopentanonees such as 2,5 dimethyl-cyclo-pentanone and/or hexanones and/or hexanones such as 3,3-methyl hexanones and/or cyclohexanones and/or heptanones, and/or one or more alcohols such as methanol, ethanol, propanol, isopropanol buthanol, isobutanol and/or one or more aromatic compounds such as toluene, xylene, cumene, ethyl benzene, 1,2,4 tri methyl benzene, 1,3,5 trimethyl benzene, 1,2,3 trimethyl benzene and/or one or more alkanes such as pentanes, hexanes, heptanes, octanes, nonanes, decanes, dodecanes or a combination thereof.

A particularly preferred embodiment is where the viscosity and/or density reducing agent(-s) comprises one or more ketones in a concentration in the range 30-60% by weight, and one or more alcohols in a concentration in the range 5-30% by weight, and one or more aromatics in a concentration in the range 10 to 40% by weight, and one or more alkanes in the concentration in the range 10 to 30% by weight.

Advantageously the viscosity and/or density reducing agent comprises a fraction of the oil phase and is recovered down stream of said further separation step and prior to providing the renewable crude oil to an optional upgrading step.

Particularly preferred viscosity and/or density reducing agents according to the present invention a low boiling fraction of the oil from the converted feed mixture comprising carbonaceous material.

The weight ratio of the viscosity and/or density reducing agent added to the amount of oil are in the range 0.01 to 2 such as in the range 0.2 to 0.4 such as in the range 0.2 to 0.35.

The separation may according to the present invention comprise means for separating gas from said mixture prior to entering the first phase separator. Said separation means may comprise a flash separator or degasser, wherein the product mixture enters the separator above liquid level and gas is withdrawn from the top.

According to an embodiment of the present invention said gas may be used to produce heat for heating in the process to the process as shown in the figure and further described above. The gas may optionally be cooled to condense compounds such as e.g. water prior to said use to produce heat for heating in the process.

A particularly preferred embodiment according to the present invention includes a system where the converted feed mixture/product mixture is first cooled to a temperature of 60 to 250° C., expanded to a pressure in the range from about 10 to about 150 bar such as in the range from about 15 to about 100 bar and led to a phase separator/degasser for separation of the product mixture into at least a gas phase and residual phase.

In an advantageous embodiment the separated gas phase is first cooled to a temperature in the range 80 to about 200° C., expanded to a pressure in the range 60 to 110 bar such as in the range 70 to 100 bar and led to a phase separator/degasser for separation of the converted feed mixture/product mixture into at least a gas phase and a residual phase.

As further exemplified in Example 1, the gas phase often comprises carbon dioxide, hydrogen, carbon monoxide, methane, ethane, propane, iso-propane, butane, iso-butane, water, methanol, ethanol, acetone.

An advantageous embodiment of the present invention includes extracting/separating hydrogen from the separated gas phase and introducing it into said process for upgrading of the hydrocarbons (optional step 9).

An embodiment of the present invention comprises extracting/separating hydrogen from the separated gas phase by a membrane gas separation technique. Another embodiment of the present invention comprises extracting/separating hydrogen using a pressure swing adsorption technique. A further embodiment of the present invention comprises extracting/separating hydrogen from said separated gas phase by the steps of:
- separating the converted feed mixture/product mixture into a gas phase and a residual phase
- cooling the separated gas to a temperature in the range from about 31 to 50° C. and separating the cooled gas phase into a condensed phase substantially free of hydrogen and a residual gas phase enriched in hydrogen and carbon dioxide in a phase separator,
- further cooling the separated gas phase to a temperature in the range from about 10 up to about 31° C. and separating the cooled residual gas phase into a liquid phase comprising $CO_2$ and a residual gas phase enriched in hydrogen in a separator.
- introducing the hydrogen enriched gas in the upgrading process after the pressurization step.

In an aspect of the present invention, the separating means may further provide at least a coarse separation of the degassed product mixture into a liquid hydrocarbon rich stream and residual water rich stream e.g. by gravimetric separation in a first phase separator according to the present invention.

The water rich stream comprising water soluble organics, suspended particles and dissolved salts may be at least partly withdrawn from said phase separator, and fed to a recovery unit, optionally after further separation by gravimetric means filtering and/or centrifugation to remove eventual suspended particles.

The degassed mixture or optionally the liquid hydrocarbon rich stream, is withdrawn from said first phase separator, and is further purified in a further separation e.g. the liquid hydrocarbon rich stream may be required to be efficiently dehydrated and/or desalted/deashed before being introduced into the upgrading part of the process in order to prevent downstream problems such as plugging or compromising the catalyst activity.

In an aspect of the present invention part of the oil phase from the first separator is withdrawn prior to the further oil purification and recycled to the feed mixture preparation step of the high pressure process.

In many aspects of the present invention said further separation step comprises one or more phase separation step(-s) optionally equipped with means for coalescing oil or water droplets such as one or more electrostatic coalescing steps.

Often the operating temperature of the further separation is selected so as to obtain a dynamic viscosity of the liquid hydrocarbon product in the range from about 1 to about 30 centipoise during said separation system such as in the range from about 1 to about 25 centipoise during said further separation, preferably the temperature of the separation is selected so as to obtain a dynamic viscosity in the range from about 1 to about 20 centipoise such as in the range 5 to 15 centipoise.

Often the operating temperature of the further separation step is selected such as it is above the melting point of solid organic particles that may be present in the oil.

The operating temperature of each of said first phase separation and/or said one or more phase separators in the further separation step may according to an embodiment of the present invention be in the range 50 to 250° C. such as in the range 120 to 200° C., preferably at least the first of said further separation is operating at a temperature in the range 130 to 180° C. such as a temperature in the range 150-170° C.

The operating pressure of said further separation may according to an aspect of the present invention be in the range 10 to 120 bar, such as in the range 15-80 bar, preferably said further separation is operating at a pressure in the range 20 to 50 bar, such as in the range 30-50 bar.

Many aspects of the present invention relate to the use of one or more phase separators, where the residence time in each of the phase separators is in the range 0.1 to 30 minutes such as in the range 1 to 20 minutes, preferably the residence time in each of the separators are in the range 2 to 15 minutes.

In a further aspect of the present invention a viscosity and/or density reducing agent may be added to the converted feed mixture before and/or during the further separation. The viscosity and/or reducing agent may often be an organic solvent having a boiling point below 200° C. such as below 150° C., preferably below 140° C. such as below 130° C.

The weight ratio of the viscosity and/or density reducing agent added to the amount of renewable oil may according to many embodiments of the present invention be in the range 0.01 to 2 such as in the range 0.05 to 1, preferably the weight ratio of the viscosity and/or density reducing agent added to the amount of oil is in the range 0.1 to 0.5 such as in the range 0.1 to 0.4. More preferably the weight ratio of the viscosity and/or density reducing agent added to the amount of oil is in the range 0.2 to 0.4 such as in the range 0.2 to 0.35.

Advantageously the viscosity and/or density reducing agent comprises a fraction of the low oil and is recovered down stream of said further separation step and prior to providing the oil to said optional upgrading step.

According to a preferred embodiment of the present invention the viscosity and/or density reducing agent is recovered in a flash separation step operating at a temperature in the range 100-200° C. such as in the range 100-160° C., preferably the viscosity and/or density reducing agent is recovered in an evaporation step operating at a temperature in the range 100-150° C. such as in the range 100-130° C.

A particular preferred embodiment of the present invention is where the viscosity and/or reducing agent is substantially recovered in one or more flash distillation step(-s) producing an oil phase and a distillate phase, and where the flash temperature is in the range 100-200° C. such as in the range 100-160° C., preferably the viscosity and/or reducing agent is recovered in the flash distillation step producing an oil phase and a distillate phase, where the flash temperature is in the range 100-150° C. such as in the range 100-130° C.

A washing agent comprising water may according to another aspect of the present invention be added to the liquid hydrocarbon product before or during said further phase separation step in order to further control the inorganics content of the oil before being introduced to the upgrading step according to the present invention. The washing agent comprising water may according to the present invention be introduced in several steps.

The weight ratio of the washing agent comprising water to oil may advantageously be in the range 0.01 to 2.0 such as a weight ratio of the washing agent comprising water to the oil is in the range 0.01 to 1.0, preferably the weight ratio of the washing agent comprising water to the oil is in the range 0.02 to 0.5 such as a weight ratio in the range 0.03 to 0.3; even more preferably the weight ratio of the washing agent(-s) comprising water is in the range 0.03 to 0.2.

The washing agent comprising water may according to an embodiment further comprise an acidification agent such as acetic acid or citric acid. The acidification agent may be added so as to obtain a pH of the pressurised washing agent after separation in the range 2 to 7 such as a pH in the range 3 to 6.5, preferably the acidification agent is added so as to obtain a pH of the water phase after separation of the pressurised washing agent comprising water in the range 3 to 6 such as a pH in the range 3 to 5.

The acidification agent may advantageously comprise carbon dioxide dissolved in water (carbonic acid). Preferably the acidification agent is prepared by mixing separated process gas with water thereby providing an acidic washing agent. One advantage of using $CO_2$ containing process as acidifying agent is that the acidifying agent is easily separated from the purified oil and washing agent comprising water.

The further separation step may according to an embodiment of the present invention further comprise one or more filtration step(-s) of the liquid hydrocarbon product. The filtration step may according to some preferred aspects of the present invention comprise the first step of the further separation and/or the filtration step may be a final step before optionally introducing the oil to an upgrading process according to an embodiment of the present invention. The mesh size of the filters applied is typically less than 50 micron or less than 30 micron; preferably less than 15 micron or less than 10 micron. The filters in the filtration step is often arranged with a valve arrangement so that at least one filter is online and at least one filter is offline for cleaning, and further comprises means for performing such cleaning e.g. by back flushing with a suitable cleaning fluid such as demineralized water or steam.

An embodiment of the present invention is where the further separation step comprises an ion exchange step downstream the one or more phase separators, flash distillation step(-s) and optional remixing of lights into the purified oil. Said ion exchange step may be comprise a cation selective resin for removing residual alkali metals such as potassium and/or sodium, alkali earth metals such as calcium and/or magnesium and/or metals such as iron, nickel, cobalt, manganese, aluminium, silicium, phosphorus or a combination thereof. The ion exchange resin may in some aspects of the invention be added in the form of a powder or beads upstream said one or more filtration step(-s) and filtered from the oil in said filtration step(-s). In another preferred embodiment said ion exchange resin may be contained in one or more fixed beds arranged an a series and parallel arrangement. Typically said fixed bed are arranged with a valve arrangement and means so that at least one fixed bed can be online and at least one ion exchanger can be offline for cleaning such as by back flushing by an acid such as hydrochloric acid or sulphuric acid.

In many aspects of the invention, the separated and purified oil after the separation system has been dehydrated to a water content of less than 3.0% by weight or less than 1.0% by weight during said separation and oil purification according to the invention; preferably to a water content of less than 0.5% by weight or less than 0.3% by weight; more preferably to a water content of less than 0.1%.

Further in many aspects of the invention, the ash content of the separated and purified oil after the separation system according to the invention is less than 500 ppm by weight or less than 300 ppm by weight; preferably less than 200 ppm or less than 100 ppm; more preferably the ash content of the separated and purified oil after the separation system according to the invention is less than 50 ppm by weight or less than 25 ppm by weight; even more preferably the ash content of the separated and purified oil after the separation system according to the invention is less than 15 ppm by weight or less than 10 ppm by weight.

8. Recovery

The water phases from the gas separating means and first phase separator and optionally from the one or more phase separators in the further separation step are fed to a recovery device, where liquid organic compounds in the form of water soluble organics and/or homogeneous catalysts are recovered in a concentrated form, and recycled to into the feed mixture preparation device 1. As mentioned above under 1. Preparation the water soluble organics present in said water phase comprise a complex mixture of hundreds of different compounds including one or more compounds of ketones, alcohols and poly alcohols, phenols and alkylated phenols, carboxylic acids, furans, alkanes, alkenes, toluene, cumene etc.

Preferably said recovery device, comprises one or more evaporation and/or distillation step(-s), wherein water is evaporated from said combined water phases, and thereby providing a distillate and a concentrate. The degree of concentration is selected so as to provide a distillate amount that corresponds to the amount of water added with the carbonaceous material, homogeneous catalyst and make up base in the pre-treatment. Typically the ratio of concentrate to the combined water phases entering the recovery unit is typically in the range from about 0.1 to about 0.9 such as in the range 0.2 to 0.8. Often the ratio of concentrate to the combined water phases entering the recovery unit is in the range from about 0.25 to about 0.7 such as in the range 0.3 to 0.6. In other embodiments of the present invention the ratio of concentrate to the combined water phases entering the recovery unit is typically in the range from about 0.25 to about 0.6 such as in the range 0.3 to 0.6.

The combined water phases may be preheated to a temperature of e.g. 70-130° C. such as a temperature in the range 80 to 115° C. before entering into said evaporator. The heat for said preheating is preferably provided by heat recovery from a process stream and/or from the outgoing distillate stream before entering into the one or more evaporator and/or distillation steps. In the evaporator, water is evaporated from said mixture comprising water soluble organics and dissolved salts at a temperature from about 100 to about 115° C. In these cases the heat recovery from said process stream may be performed via a heat transfer medium such as a hot oil or steam.

The pH of the combined water phase entering the recovery is according to the present invention preferably maintained at alkaline conditions such as in the range 7 to 14 such as a pH in the range 8 to 12, preferably the pH of the water phase to the recovery unit is maintained in the range 8 to 11. Operating at such inlet pH to the recovery unit has the advantage of reducing the amount of phenolics in the distillate.

An embodiment of said recovery step according to the present invention is where the recovery step comprises one or more flash step(-s).

A preferred embodiment of said recovery step according to the present invention is where the recovery step comprises evaporation and/or distillation in two or more stages operating at a decreasing pressure and temperature and each being heated with the evaporated vapor from the foregoing step to minimize the heat required for the evaporation.

The evaporator may advantageously further comprise condensing said evaporated vapor in two or more condensation steps, where the condensation temperatures in said condensation steps are decreasing so as to obtain a fractionation of the evaporated fraction i.e. a fraction comprising water and eventually higher boiling compounds, and a fraction where compounds having a boiling point temperature lower than water are concentrated.

Preferably said evaporated vapor passes a demister and/or a foam breaker prior to condensation of said evaporated fraction by cooling. Advantageously the evaporator may according to the present invention further be equipped with a coalescer and an absorber, where the evaporated fraction is contacted with an absorbent. Said absorbent comprises in a particularly preferred embodiment a base such as sodium hydroxide.

The evaporator according to the present invention may in some embodiments include increasing the condensation temperature of said evaporated water by increasing the pressure by a blower, compressor (Mechanical Vapor Recompression) or a steam jet ejector (Thermal Vapor Recompression) or a combination thereof. Thereby the evaporated water vapor can be used as a heating medium for the evaporation in said evaporator, and said evaporator becomes very energy efficient as the latent heat of evaporation does not need to be supplied to said evaporation step.

It should be noted that said condensers according to the present invention may comprise heat exchangers where the media to be concentrated are evaporated on the other side, but in general said evaporation step according to the present invention comprises at least one additional condenser compared to the number of evaporation steps.

The fraction comprising evaporated water ("distillate") may further be cooled to a temperature suitable for discharge in a cooler. Hereby, it is obtained that said evaporator besides recovering said liquid organic compounds and/or homogeneous catalysts also cleans and purifies the water phase in an efficient manner, and can produce a water phase that may be reused or discharged to a recipient. Optionally the "distillate" may be subjected to one or more polishing steps. Said polishing steps may include an absorber and/or adsorber and/or a coalescing step and/or a distillation step and/or a membrane system such as reverse osmosis and/or a biological treatment system such as a bioreactor.

The fraction being concentrated with compounds having a boiling point lower than water may according to a preferred embodiment be mixed with the concentrate from said evaporator, and recycled to the feed mixture preparation step 1.

In many applications according to the present invention a bleed or purge stream is withdrawn from said concentrated water phase prior to recycling to the feed mixture preparation step 1 to prevent buildup of compounds such as chloride. The bleed stream may according to an embodiment of the present invention comprise up to about 40% by weight of the concentrated water phase from the recovery unit such as up to about 25% by weight of the concentrated water phase from the recovery unit. Preferably the bleed stream comprises up to about 20% by weight of the concentrated water phase from the recovery unit such as up to about 15% by weight of the concentrated water phase from the recovery unit. More preferably the bleed stream comprises up to about 10% by weight of the concentrated water phase from the recovery unit such as up to about 5% by weight of the concentrated water phase from the recovery unit. The bleed stream may be disposed off. However, in many applications according to the present invention the bleed stream is further treated.

The concentrated water phase from the recovery unit typically has a positive heating value.

A preferred application according to the present invention comprises further treating the bleed stream by combustion and/or co-combustion in a boiler or incinerator. Optionally the bleed stream is further concentrated prior to said combustion and/or co-combustion.

A particularly preferred embodiment of the present invention comprises further treating the bleed stream in an ion exchange step. The concentrated water phase from the recovery unit may be filtered to remove eventual solids prior to entering said ion exchange step according to the present invention.

The ion exchange step may according to a preferred embodiment of the present invention comprise one or more ion exchange steps such as one or more ion exchange resin(-s) contained in one or more fixed beds. Said one or more ion exchange steps may be arranged with one or more fixed bed(-s) in parallel and/or one or more fixed bed(-s) in series.

An advantageous embodiment of the present invention comprises further treating the bleed stream comprises at least two fixed bed(-s), each containing a chloride selective ion exchange resin capable of selectively adsorbing chloride from said concentrated water phase from said recovery unit and arranged valves in a parallel arrangement so that at least one ion exchange bed is online and at least one ion exchange bed is offline. Hereby continuous operation is ensured and chloride removal can be continued in the ion exchange bed(-s) being online while ion exchange bed(-s) being offline can be cleaned. Said cleaning may according to an embodiment of the present invention be performed by a back flow or back flushing of the ion exchange bed(-s) by demineralized water such as distillate water from the recovery unit. The present invention includes a valve arrangement and/or control system allowing for such cleaning or regeneration by back flow or back flush with demineralized water.

Typically the chloride removal in said ion exchange step according to the present invention is at least 50% of the chlorides in the concentrated water phase entering said ion exchange step such as a chloride removal of at least 60%. In many embodiments according to the present invention the chloride removal in said ion exchange step according to the present invention is at least 70% of the chlorides in the concentrated water phase entering said ion exchange step such as at least 80%. The chloride depleted stream from said chloride ion exchange step is preferably recycled to the feed mixture preparation step 1.

Further, in many embodiments according to the present invention the amount of homogeneous catalyst(-s) in the form of potassium and/or sodium such as being retained in said chloride depleted outlet stream from said chloride ion exchange step is at least 70% by weight of the amount entering said chloride ion exchange step such as at least 80% by weight. Preferably, the amount of homogeneous catalyst (-s) in the form of potassium and/or sodium such as being retained in said chloride depleted outlet stream from said chloride ion exchange step is at least 85% by weight of the amount entering said chloride ion exchange step such as at least 90% by weight. Hereby, less make up homogeneous catalyst is required to be added in the pretreatment step 1, and a more economical process is obtained for providing crude oil to the upgrading process according to the present invention, and thereby an overall more efficient and economical process is obtained.

9. Upgrading

The crude oil produced in step 1 may optionally be further subjected to an upgrading step to produce finished transportation fuels, lubricants and/or finished fuels or blendstocks for such.

The renewable crude oil may further be subjected to an upgrading process, where it is pressurized to a pressure in the range from about 20 bar to about 200 bar such as a pressure in the range 50 to 120 bar, before being heated to a temperature in the range 300 to 400° C. in one or more steps and contacted with hydrogen and hydro-treating and/or hydro-processing catalyst(s) contained in one or more reaction zones, and optionally fractionated into different boiling point fractions.

Figure 8:
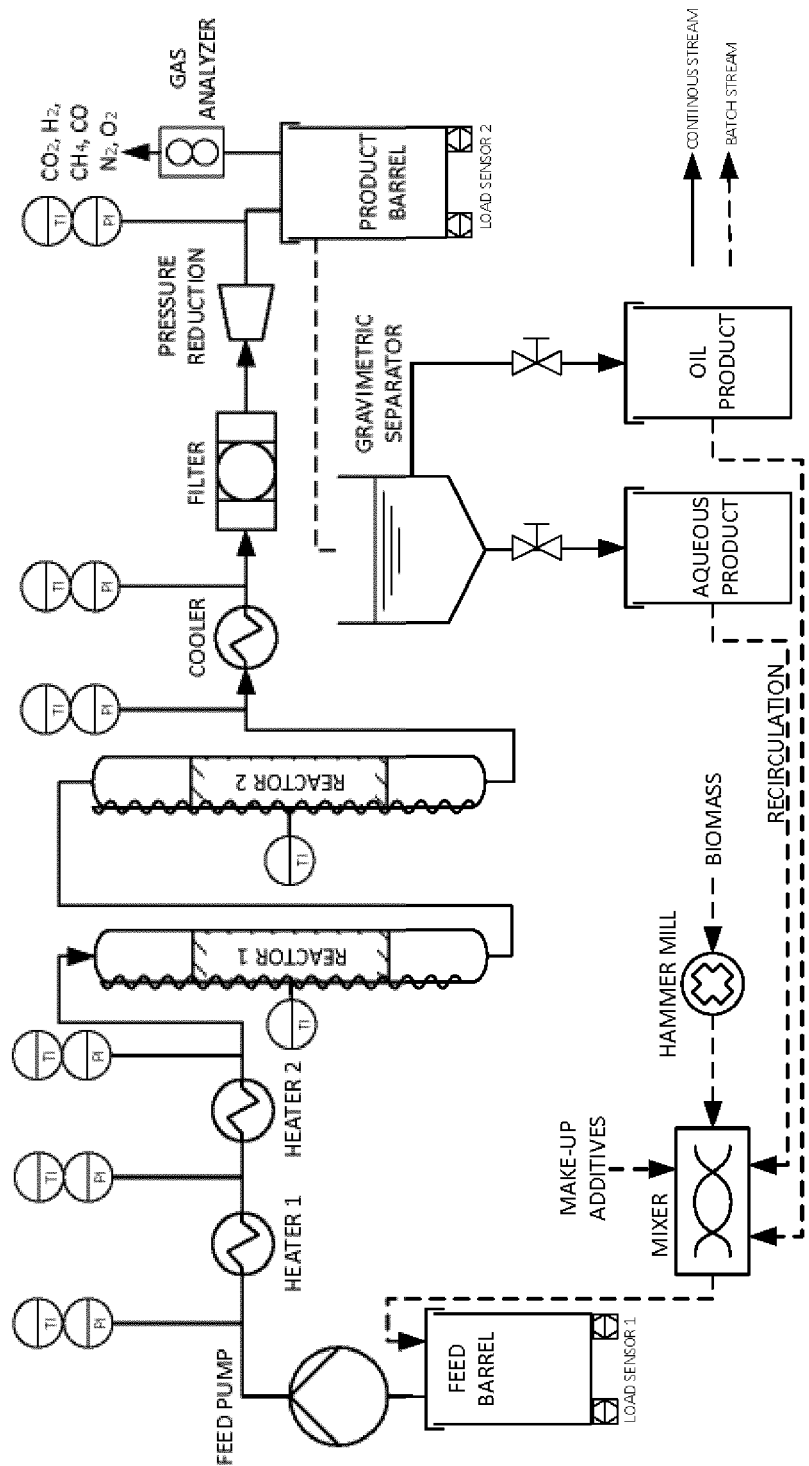
FIG. 8 shows a process flow diagram of the plant used to produce the oil in example 1.

FIG. 8 shows a flow diagram of continuous pilot plant used to provide oil in the examples below. Carbonaceous material such as biomass is pre-treated. The first part of the pretreatment includes a size reduction in a hammermill to a maximum particle size of about 2 mm. The milled carbonaceous material is subsequently processed into a feed mixture in the slurry by mixing with other ingredients such as recycled water phase, recycled oil phase, makeup catalyst, and sodium hydroxide (to adjust pH). The feed mixture is then pressurized to a pressure range of 300-350 bar by the feed pump, heated to 370-420° C. in two electric heaters before entering the reactors. The reactors comprise two top fed cylindrical reactors connected in series. Depending of the specific flow rate used the retention/residence time in the reactors is in the range 4 to 25 minutes. The product mixture from the reactors is cooled to 80-120° C. by a water cooler. The product mixture continues through a 250 μm filter for separation of solid particles and dependent on the filtration temperature eventually high boiling liquid hydrocarbon compounds. Pressure let down is carried out through a series of 1.75 mm ID capillaries with an individual length of 100-400 m. The depressurized product mixture is further cooled to a temperature of 20-80° C., and proceeds to a flash tank for separation of the products. The gaseous product is separated from the liquid phase comprising liquid hydrocarbons (oil) and water with water-soluble organics, dissolved salts and eventually suspended particles. An oil is gravimetrically separated from the aqueous products.

Figure 9:
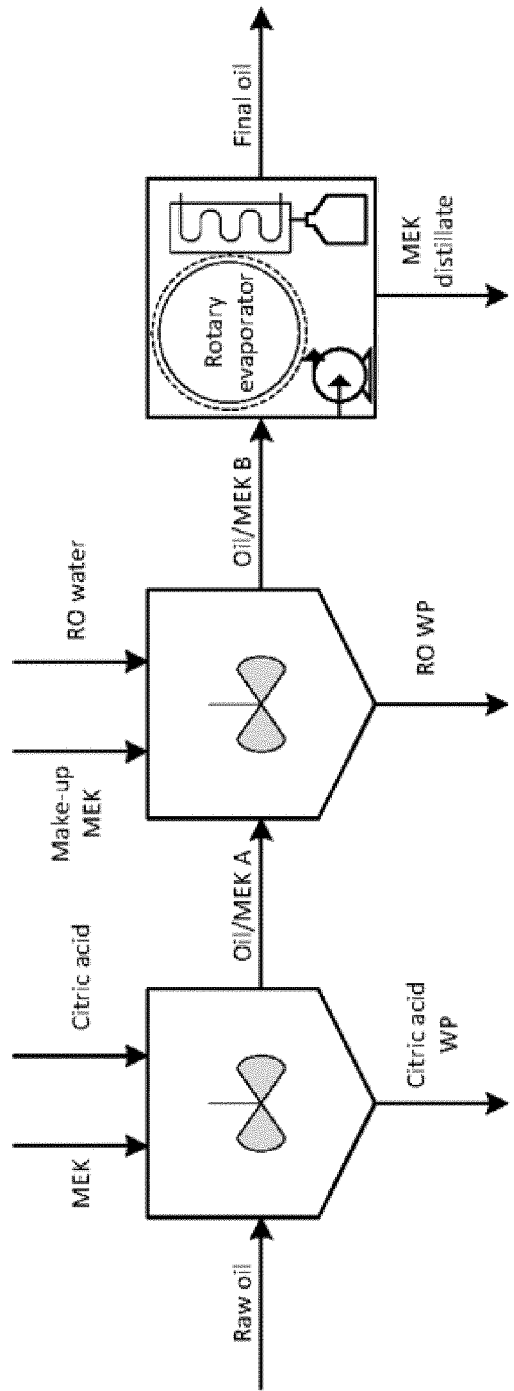
FIG. 9 shows a process flow diagram of the separation system used for separation of oil in example 2 and 3.

FIG. 9 shows a graphical abstract of the washing procedure applied and further described in Example 2.

Figure 10:
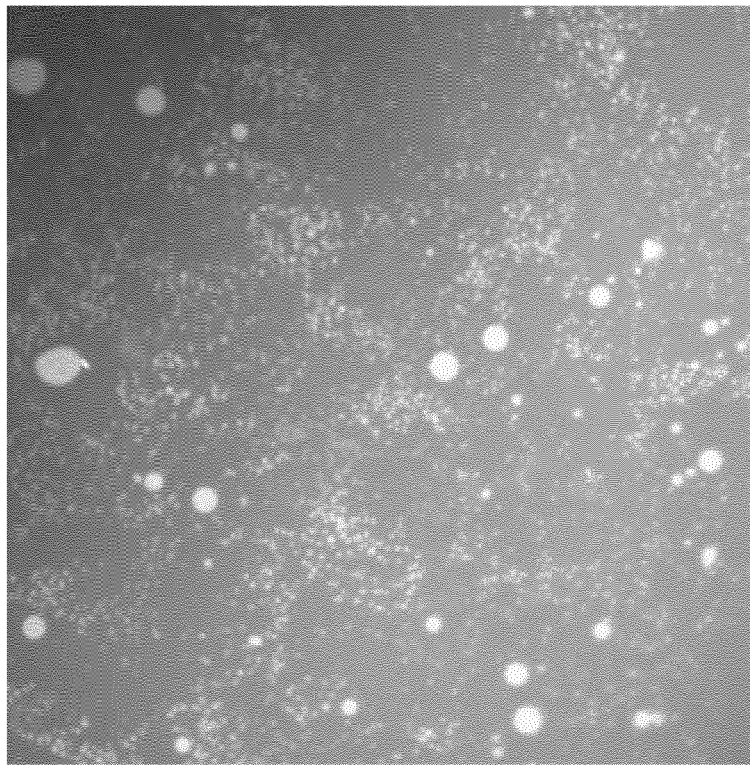
FIG. 10 shows initial microscope photos of the water in oil emulsion at 30 bar nitrogen and carbon dioxide pressure respectively.
Figure 10:
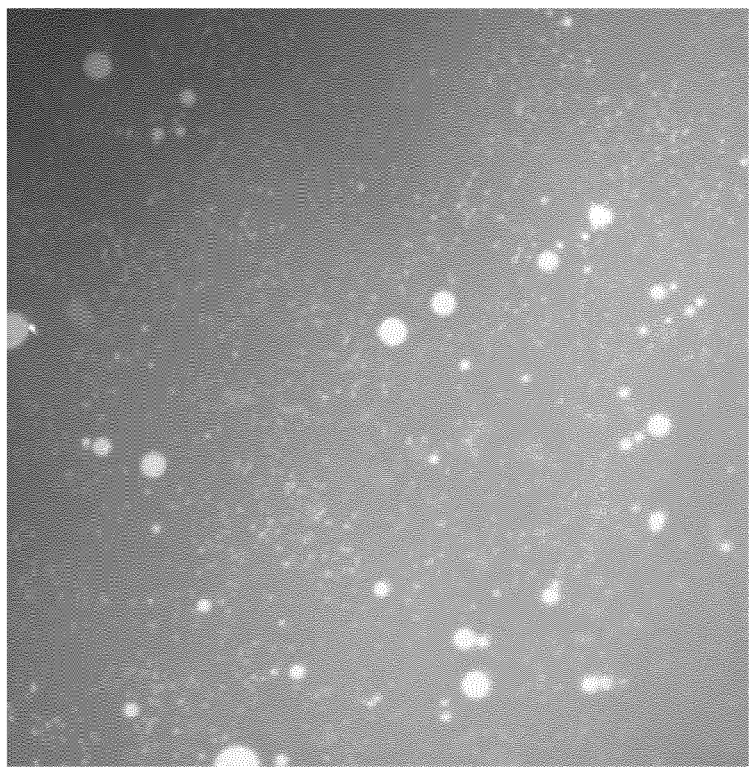
Figure 11:
FIG. 11 shows microscope photos of the water in oil emulsions after 20 minutes at 30 bar nitrogen and carbon dioxide pressure respectively.
Figure 11:
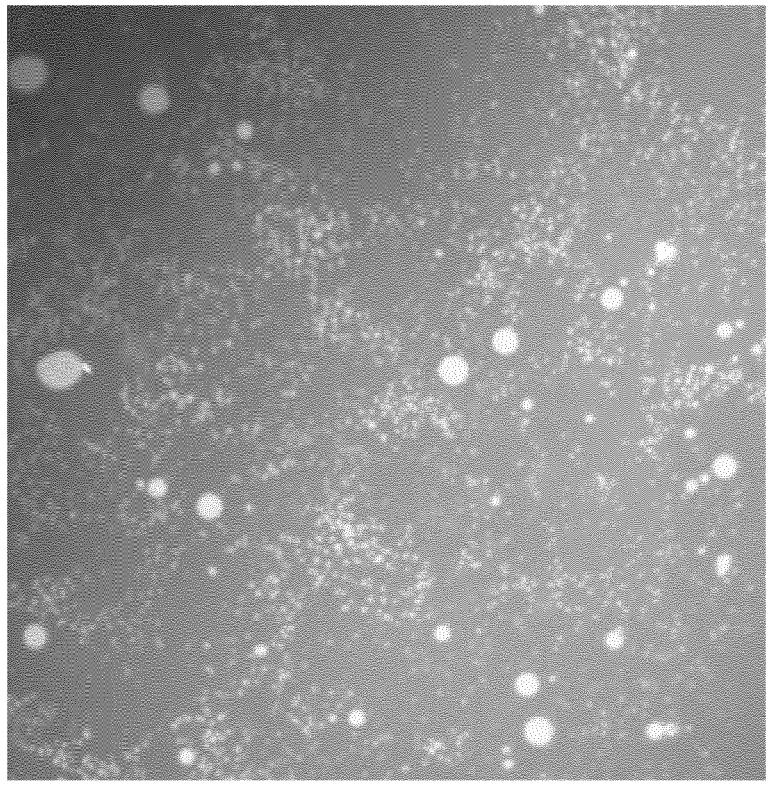

FIG. 10-11 shows reflecting light microscopy (100× magnification) of water in renewable crude oil emulsion 0 min and 20 min after purging with 30 bar $N_2$ versus 30 bar $CO_2$ atmospheres. The pictures are taken through a glass window in the bottom of the pressurised vessel, and the bright spots indicate water droplets. In nitrogen atmosphere, small water droplets appear during the 20 min gravimetric separation, but little coalescence is observed and the emulsion seems rather stable after 20 min. In comparison, more coalescence is observed in the $CO_2$ atmosphere, where larger droplets have formed during the 20 min separation, thus making the emulsion less stable. Furthermore, differences in water droplet shapes indicate that the atmosphere affects surface tension in the emulsion.

Example 1

Providing Oil According to a Preferred Embodiment of the Present Invention

An oil was produced from a 50/50 mixture on a dry weight basis of fresh spruce and fresh pine using the pilot plant in FIG. 8. The analysis of the wood chips as received is shown in Table 1 below.

TABLE 1

Composition of carbonaceous material on a dry ash free basis.

| ELEMENT | SPRUCE | PINE | 50/50 MIXTURE |
|---|---|---|---|
| C, wt. % | 50.4 | 50.2 | 50.3 |
| H, wt. % | 6.1 | 6.2 | 6.15 |
| O, wt. % | 43.1 | 43.4 | 43.25 |
| S, wt. % | 0 | 0 | 0 |
| N, wt. % | 0.2 | 0.1 | 0.15 |
| Cl, wt. % | 0.008 | 0.007 | 0.0074 |
| HHV, MJ/kg | 20.2 | 20.1 | 20.15 |

Feed Preparation

The wood chips were sized reduced to wood flour in a hammer mill system and mixed with recycled water (inclusive dissolved salts and water soluble organics), recycled oil, catalysts to produce a homogeneous and pumpable feed mixture. Potassium carbonate was used as catalyst and sodium hydroxide was used for pH adjustment. It was attempted to keep the potassium concentration constant during the runs i.e. the potassium concentration in the water phase was measured and the required make-up catalyst concentration was determined on this basis. Sodium hydroxide was added in amounts sufficient to maintain the outlet pH of the separated water phase in the range 8.0-8.5. Further CMC (Carboxy Methyl Cellulose, $M_w$=30000) in a concentration of 0.8 wt. % was added to the feed slurry as a texturing agent to avoid sedimentation in the feed barrel and improve pumpability.

As neither water nor oil phases was available for the first cycle (batch), crude tall oil was used as start up oil and 5.0 wt. % ethanol and pure water (Reversed Osmosis water, RO water) was used to emulate the water phase in the first cycle. Multiple cycles (batches) are required before the process can be considered in steady state and representative oil and water phases are produced. The number of cycles required to produce oil with less than 10% concentration of the start up oil is shown in Table 2. The numbers are valid for a feed composed of 20% dry wood by weight, an Oil Yield of dry ash free oil of 45.3% by weight, and an oil/wood ratio of 1 for the first three cycles and 0.8 for the subsequent cycles:

As seen in the table, approximately 6 cycles are required to produce representative oil with less than 10% of the start up oil. Hence, 6 cycles were carried out, where the oil and water phase produced from the previous cycle was added to the feed mixture for the subsequent cycle. The feed composition for the 6th cycle run is shown in Table 3 below:

TABLE 3

Feed mixture composition for $6^{th}$ cycle run.

| Pine wt. % dry | Spruce wt. % dry | CMC wt. % dry | Recirc. oil from $5^{th}$ cycle wt. % dry | Water contained in wood and recycled oil wt. % | Recirc. water phase from 5th cycle wt. % | K wt. % | NaOH wt. % | Total wt. % |
|---|---|---|---|---|---|---|---|---|
| 11.1 | 11.1 | 0.8 | 18.2 | 9.8 | 45.2 | 2.3 | 1.5 | 100.0 |

The feed mixture in Table 3 were all processed at a pressure of about 320 bar and a temperature around 400° C. The de-gassed product was collected as separate mass balance samples (MB) in barrels from the start of each test, and numbered MB1, MB2, MB3, etc. The collected products were weighed, and the oil and water phases were gravimetrically separated and weighed. Data was logged both electronic and manually for each batch.

Total Mass Balance

The Total mass balance ($MB_{Tot}$) is the ratio between the total mass leaving the unit and the total mass entering the unit during a specific time. The total mass balance may also be seen as a quality parameter of the data generated. The average value is 100.8%.

TABLE 2

Estimation of number of cycles needed for producing oil with more than 90 wt.- % wood derived from the produced oil.

| CYCLE NO. | BIOMASS KG | RECIRCULATED OIL. KG | | PRODUCED BIO OIL KG | CRUDE TALL OIL IN OIL PRODUCT % |
|---|---|---|---|---|---|
| | | Total | Crude Tall Oil | | |
| 1 | 20 | 20 | 20 | 9.1 | $\frac{20}{29.1} \times 100 = 68.7\%$ |
| 2 | 20 | 20 | 20 × 68.7% = 13.7 | 9.1 | $\frac{13.7}{29.1} \times 100 = 47.2\%$ |
| 3 | 20 | 20 | 20 × 47.2% = 9.4 | 9.1 | $\frac{9.4}{29.1} \times 100 = 36.5\%$ |
| 4 | 20 | 16.6 | 16.6 × 32.3% = 5.4 | 9.1 | $\frac{5.4}{25.7} \times 100 = 20.8\%$ |
| 5 | 20 | 16.4 | 16.4 × 20.8% = 3.4 | 9.1 | $\frac{3.4}{25.5} \times 100 = 13.3\%$ |
| 6 | 20 | 16.4 | 16.4 × 13.3% = 2.2 | 9.1 | $\frac{2.2}{25.5} \times 100 = 8.6\%$ |
| 7 | 20 | 16.4 | 16.4 × 0.086% = 1.4 | 9.1 | $\frac{1.4}{25.5} \times 100 = 5.6\%$ |

Oil Yield from Biomass (OY)

The Oil Yield from Biomass (OY) expresses the fraction of incoming dry biomass that is converted to dry ash free oil. It's defined as the mass of dry ash free Oil produced from dry biomass during a specific time divided by the mass of dry biomass entering the unit during the same time. The recirculated oil is not included in the balance, it's subtracted from the total amount of oil recovered when calculating the oil yield from biomass. The average oil yield (OY) was found to be 45.3 wt. % with a standard deviation of 4.1 wt. % i.e. 45.3% of the mass of dry biomass (wood+CMC) in the feed is converted to dry ash free Oil.

Detailed Oil Analysis

Data measured for the oil is presented in Table 4.

TABLE 5

Gas composition for the gas produced in the process.

| COMPONENT | vol %, A.R | vol %, AIR FREE* | wt. %, AIR FREE | HHV, MJ/KG | LHV, MJ/KG |
|---|---|---|---|---|---|
| $H_2$ | 24.00 | 25.79 | 1.69 | 2.40 | 2.02 |
| $O_2$* | 0.40 | 0.0 | 0.0 | 0.0 | 0.0 |
| $N_2$ | 1.50 | 0.02 | 0.01 | 0.00 | 0.00 |
| $CO_2$ | 56.90 | 61.14 | 87.27 | 0.00 | 0.00 |
| CO | 0.30 | 0.32 | 0.29 | 0.03 | 0.03 |
| $CH_4$ | 6.70 | 7.20 | 3.75 | 2.08 | 1.87 |
| Ethene | 0.16 | 0.17 | 0.16 | 0.08 | 0.07 |
| Ethane | 2.20 | 2.36 | 2.31 | 1.20 | 1.10 |

TABLE 4

Data for $6^{th}$ cycle oil

| PARAMETER | UNIT | WHOLE OIL, (DEHYDRATED) | LIGHT FRACTIONS (180-260° C.) | LIGHT FRACTIONS (260-344° C.) | HEAVY FRACTION (344° C.) |
|---|---|---|---|---|---|
| Yield on Crude, wt. % | | | 11.6 | 21.1 | |
| C | wt. % (daf) | 81.9 | 80.3 | 82.3 | 84.8 |
| H | wt. % (daf) | 8.7 | 10.3 | 9.5 | 8.0 |
| N | wt. % (daf) | 0.09 | n.a | n.a | <0.75 |
| S | wt. % (daf) | 0.008 | n.a | n.a | n.a |
| O | wt. % (daf) | 10.1 | 9.4 | 8.2 | 8.2 |
| Density, 15° C. (Whole Oil, a.r) | kg/l | 1.0729 | | | |
| Density, 15° C. | kg/l | n.a | 0.9425 | 1.0236 | 1.1541 |
| Density, 40° C. | kg/l | 1.0572 | | | |
| Density, 50° C. | kg/l | 1.0503 | | | |
| Density, 60° C. | kg/l | 1.0435 | | | |
| Density, 70° C. | kg/l | 1.0368 | | | |
| HHV (daf) | MJ/kg | 38.6 | 38.5 | 37.5 | 37.7 |
| Kinematic Viscosity, 40° C. | mm²/s | 17360 | 2.996 | | 9812 (150° C.) |
| Kinematic Viscosity, 60° C. | mm²/s | 1545 | | | 1298 (175° C.) |
| Total Acid Number | mg KOH/g | 8.8 | 3.75 | 8.2 | 8.2 |
| Strong Acid Number | mg KOH/g | <0.01 | | | |
| Pour point (maximum) | ° C. | 24 | -60 | -15 | 140 |
| Flash point | ° C. | 59 | 90 | 146 | |
| Moisture content | wt. % | 0.88 | | | |

Energy Recovery in the Produced Hydrofaction Oil

The Energy Recovery ($ER_{oil}$) expresses how much of the chemical energy in the fed wood that are recovered in the oil. It does not take into account the energy required for heating nor the electrical energy supplied to the unit. For the calculations of recoveries, a High Heating Value (HHV) for the oil of 38.6 MJ/kg were used together with the HHV for the wood mixture given in Table 1. The resulting energy recovery for the $6^{th}$ cycle oil was 85.6% with a standard deviation of 7.7 i.e 85.6% of the (chemical) energy in wood fed to the plant is recovered in the produced oil.

Gas Production and Gas Analyses

Gas is produced in the process of converting biomass into oil. The yield of gas produced from dry wood in the feed is 41.2 wt. %. The gas is composed of mainly $CO_2$, $CH_4$ and other short hydrocarbons (C2-C4), $H_2$ and some lower alcohols. Gas was sampled and analyzed by Sveriges Tekniska Forskningsinstitut (SP) in Sweden. The analysis of $6^{th}$ cycle gas is shown in Table 5 along with heating values of the gas estimated from the gas composition. Since a HTL process runs at reductive conditions, it's assumed that the gas is oxygen ($O_2$) free and the detected oxygen in the gas origin from air leaking into the sample bags when filled with gas sample. The gas composition is corrected for the oxygen (and nitrogen). The calculated elemental composition of the gas is shown in Table 6.

TABLE 5-continued

Gas composition for the gas produced in the process.

| COMPONENT | vol %, A.R | vol %, AIR FREE* | wt. %, AIR FREE | HHV, MJ/KG | LHV, MJ/KG |
|---|---|---|---|---|---|
| Propene | 0.27 | 0.29 | 0.40 | 0.19 | 0.18 |
| Propane | 0.95 | 1.02 | 1.46 | 0.74 | 0.68 |
| Sum $C_4$ | 0.63 | 0.68 | 1.25 | 0.62 | 0.57 |
| Methanol | 0.41 | 0.44 | 0.46 | 0.10 | 0.09 |
| Ethanol | 0.27 | 0.29 | 0.43 | 0.13 | 0.12 |
| Acetone | 0.26 | 0.28 | 0.53 | 0.17 | 0.15 |
| Total | 94.95 | 100 | 100 | 7.73 | 6.89 |

Oxygen ($O_2$) in the as received gas (a.r) is assumed to origin from air contamination of the gas when filling the sample bag. The produced gas composition is assumed air (Oxygen) free.

TABLE 6

Elemental gas composition.

| ELEMENT | wt. % |
|---|---|
| C | 32.0 |
| H | 3.8 |

TABLE 6-continued

Elemental gas composition.

| ELEMENT | wt. % |
|---|---|
| N | 0.0 |
| O | 64.1 |
| Total | 100 |

Example 2

Two step Oil Washing using Oil/MEK+Citric Acid Ratio 1 in First Step and Oil/MEK to RO Water 1 in Second Step+Evaporation of Lights+Water in Rotary Evaporator A two-step washing experiment was carried out according to the following procedure, using a steady state renewable crude oil, produced according to the procedure in Example 1. The washing procedure is schematized in FIG. 9.

Step 1: Removal of Water and Lights

Collection of the organic lights by evaporation to an atmospheric equivalent temperature (AET) equal to 130° C. in the rotary evaporator. The water and organic lights can be separated either by gravimetric separation or by freezing to −10° C. and decanting. The lights need to be collected prior to dilution with Methyl Ethyl Ketone (MEK) in order to keep track of this fraction and not lose it under subsequent MEK removal. The lights are to be stored until Step 4.

Step 2: Dilution with MEK and Washing with Citric Acid Solution

The dewatered oil from Step 1 was diluted in a 1:1 ratio with MEK. The diluted mixture is then washed using 0.1M citric acid in a 2:1 washing agent to oil ratio. The two phases are mixed thoroughly by a high-speed disperser, and then separated gravimetrically. Subsequently, de-ionized water is added to the oil in a 2:1 water to oil ratio, mixed and separated gravimetrically. An additional wash with deionized water is included based on a hypothesis that left-over water, containing both citric acid and trace alkali metals, in the oil phase can be diluted to reduce the Total Acid Number (TAN) and inorganics content of the final oil product.

Step 3: MEK and Water Removal

Use of the rotary evaporator to recover MEK and trace water from the washing in Step 2. The AET should match that of Step 1.

Step 4: Blend-in of Lights

Finally, the lights recovered in Step 1 is mixed in the washed and dewatered oil from Step 3. The lights contain no or little inorganics since it is distilled off.

Table 7 lists ash content, water content and Total Acid Number (TAN) for the raw, intermediate and final oil. The intermediate oils that are dissolved in MEK are also given on a dry and MEK free basis in order to compare with the final oil quality. The ash content reflects the amount of inorganics in the particular phase. The washing step with 0.1M citric acid reduces the ash content from 3.7 wt. % to around 850 ppm in oil A. The water content is also reduced during the acid wash from 14.3% to 8.3%. Assuming that the 850 ppm ash is situated in the trace water only, the ash content of the trace water should be 1.03 wt. %. This matches well with the ash content of 1.17 wt. % in the citric acid water product that was separated from this particular wash (see Table 8). This is one argument for an additional wash with deionized water to dilute the water emulsified in the oil.

After the evaporation step where MEK and water is removed at around 130° C. AET, the final bio-oil contains 0.6 wt. % water and around 370 ppm ash.

TABLE 7

Oil phase before and after the first and second wash.

| Analysis | Raw oil | Oil/ MEK A | Oil A[a] | Oil/ MEK B | Oil B[a] | MEK dist. | Final Oil |
|---|---|---|---|---|---|---|---|
| Ash [ppm] | 3.70 wt. % | 470 | 850 | 180 | 330 | 0 | 370 |
| H2O [wt. %] | 14.3% | 4.6% | 8.3% | 4.3% | 7.8% | 8.8% | 0.6% |
| TAN [mg KOH/g] | 8 | 24 | 44 | 22 | 40 | 0 | 45 |

[a] dry & MEK free basis

Table 8 shows a list of parameters determined for the in- and output water streams for each washing step. Note, how these results emphasize that the majority of the alkali catalysts are removed from the oil during the first wash, where ash content, pH and potassium content of the citric acid solution increases while the Total Acid Number (TAN) decreases.

TABLE 8

Water phase evaluation before and after the first and second wash.

| Analysis | 0.1M Citric acid | Citric acid WP | RO water | RO WP |
|---|---|---|---|---|
| Ash [wt. %] | 0.00% | 1.17% | 0.00% | 0.05% |
| pH | 1.8 | 6.3 | 6.0 | 5.9 |
| TAN [mg KOH/g] | 17.0 | 1.0 | 0.0 | 0.1 |
| TOC [g/l] | 4 | 57 | 0 | 66 |
| MEK calc. [wt. %] | 0% | 7% | 0% | 10% |
| Alcohol [g/l] | 0.3 | 5.7 | 0.0 | 2.9 |
| Phenol [mg/l] | 0.0 | 246 | 0.0 | 204 |
| Kalium [g/l] | 0.0 | 2.9 | 0.0 | 0.1 |

The total mass balance representing all in- and output streams was found to be 99.8%. Overall water and MEK balances are closed to 100.1% and 103.6% respectively. An ash reduction from 3.7 wt. % to 370 ppm was obtained in the laboratory experiment. The final oil contained 0.6% water and has a TAN of 45 mg KOH/g oil.

Example 3

Pressurised $CO_2$ in Water as Acidifying Agent $CO_2$ is the major constituent of the process gas in example 1. Pressurised $CO_2$ in water (carbonated water) has been observed to improve phase separation through its ability to lower the pH similar to the citric acid solution used in Example 2. A series of experiments were carried out to determine the effect of carbonated water as washing agent. The experiments were conducted in 15 ml tubular separation vessels, in which the reagents were mixed, mildly shaken and left for separation for 20 hours in vertical position. Products were recovered at pressure through a needle valve in the bottom and analysed for pH and ash content. The oil used as feed for the experiments were produced according to Example 1 and contained 4.2 wt. % ash (inorganics) as produced.

Table 9 compares a set of experiments conducted to show the effect of pressurised $CO_2$ versus pressurised $N_2$ or gravimetric separation at atmospheric pressure. No phase separation was observed in neither 30 bar $N_2$ nor in air at atmospheric pressure, which is most likely due to the elevated pH. In comparison 30 bar $CO_2$ reduced the ash content of the oil from 4.2 wt. % to 1505 ppm in one step. MEK was used as solvent in a 1:1 ratio and RO water as washing agent in a 2:1 ratio in all experiments of Table 10.

TABLE 9

Effect of atmosphere and pressure

| Name | Agent | Solvent | Gas | Pressure [bar] | Temperature [C.] | pH WP | Ash WP [wt.. %] | Ash Oil* [ppm] |
|---|---|---|---|---|---|---|---|---|
| SA19 | RO water (2:1) | MEK (1:1) | Air | 0 | 20 | 8.1 | NA | NA** |
| SA20 | RO water (2:1) | MEK (1:1) | N2 | 30 | 20 | 8.3 | NA | NA** |
| SA18 | RO water (2:1) | MEK (1:1) | CO2 | 10 | 20 | 7.0 | 0.5% | 3133 |
| SA1 & 2 | RO water (2:1) | MEK (1:1) | CO2 | 30 | 20 | 6.9 | 0.5% | 1505 |

*MEK free basis
**No phase separation observed

Table 10 lists the resulting ash contents after separation using either deionized water (RO water) or process water as washing agent. Process water refers to the $6^{th}$ cycle aqueous product from Example 1, and it is characterised by pH 8.1 and an ash content of 8.7 wt. % as produced. Process water is included in the experiments to study a $1^{st}$ phase separator, where relatively high ash (inorganics) content process water will be present. Table 10 indicates that additional ash removal (compared to the feed) can be obtained in a $1^{st}$ phase separator, where process water and process gas (mainly $CO_2$) is applied at 30 bar with or without a viscosity and/or density reducing agent. Such $1^{st}$ phase separator improves the oil phase before a $2^{nd}$ phase separator that utilises e.g. deionized water as washing agent.

Table 10 also emphasizes the importance of a viscosity and/or density reducing agent, and in particular MEK improves separation. Lights refer to the light fraction of oil described in Step 1, Example 2.

TABLE 10

Effect of washing agent and solvent

| Name | Agent | Solvent | Gas | Pressure [bar] | Temperature [C.] | pH WP | Ash WP [wt.. %] | Ash Oil* [ppm] |
|---|---|---|---|---|---|---|---|---|
| SA5 | Process water (2:1) | None | $CO_2$ | 30 | 150 | 7.4 | 9.8% | 21500 |
| SA11 | Process water (2:1) | MEK (1:1) | $CO_2$ | 30 | 20 | 7.4 | 8.6% | 11400 |
| SA1 & 2 | RO water (2:1) | MEK (1:1) | $CO_2$ | 30 | 20 | 6.9 | 0.5% | 1505 |
| SA9 | RO water (2:1) | Lights (1:1) | $CO_2$ | 30 | 20 | 6.8 | 0.7% | 5448 |

*MEK free basis

Table 11 indicates a higher degree of ash removal at a temperature of 150° C. as compared to 20° C. This may be explained by improved coalescence due to a higher collision rate at higher temperatures; and/or weakened adsorption equilibriums for inorganics at higher temperatures; and/or lower viscosity; and/or larger density difference between the aqueous and organic phase; and/or re-dissolving/melting of solid organic compounds at higher temperatures.

TABLE 11

Effect of temperature using two different solvents and RO water.

| Name | Agent | Solvent | Gas | Pressure [bar] | Temperature [C.] | pH WP | Ash WP [wt. %] | Ash Oil* [ppm] |
|---|---|---|---|---|---|---|---|---|
| SA1 & 2 | RO water (2:1) | MEK (1:1) | CO2 | 30 | 20 | 6.9 | 0.5% | 1505 |
| SA3 & 4 | RO water (2:1) | MEK (1:1) | CO2 | 30 | 150 | 6.9 | 0.9% | 1019 |
| SA9 | RO water (2:1) | Lights (1:1) | CO2 | 30 | 20 | 6.8 | 0.7% | 5448 |
| SA8 | RO water (2:1) | Lights (1:1) | CO2 | 30 | 150 | 6.9 | 1.1% | 1581 |

*MEK free basis

Table 12 indicates the effect of reducing the washing agent to oil ratio. At a reduced agent to oil ratio, the pH and WP ash content increases, which in turn also reduces the separation efficiency leading to a higher ash content of the resulting oil phase.

TABLE 12

Effect of washing agent to oil ratio.

| Name | Agent | Solvent | Gas | Pressure [bar] | Temperature [C.] | pH WP | Ash WP [wt. %] | Ash Oil* [ppm] |
|---|---|---|---|---|---|---|---|---|
| SA3 & 4 | RO water (2:1) | MEK (1:1) | CO2 | 30 | 150 | 6.9 | 0.9% | 1019 |
| SA16 & 17 | RO water (1:1) | MEK (1:1) | $CO_2$ | 30 | 150 | 7.2 | 1.6% | 2318 |

*MEK free basis

Example 4

Effect of Emulsion Breaker

A raw crude bio-oil with an initial ash content of about 20000 ppm were tested by adding an emulsion breaker (EB) to a mixture oil/MEK/water/citric acid (1:1:0.1:0.1 by weight). The tests were performed in batch reactors at 150° C., with a retention time of 270 min. The batch reactors allowed for a gas and liquid outlet stream. The reactor was initially pressurized to 30 bar with $CO_2$. The results suggest when EBs that have high affinity with the oil phase are used, a further reduction in the ash content of more than 60% is obtained compared to the blank test. The results are shown in table 13.

TABLE 13

Effect of washing agent to oil ratio.

| Name | Agent | Solvent | EB [ppm] | Gas | Pressure [bar] | Temperature [° C.] | Ash Oil* [ppm] |
|---|---|---|---|---|---|---|---|
| Oil | — | — | — | — | — | — | 20000 |
| Blank | RO water (1:0.1) CA (1:0.1) | MEK (1:1) | — | $CO_2$ | 30 | 150 | 494 |
| TD-112 | RO water (1:0.1) CA (1:0.1) | MEK (1:1) | 2000 | $CO_2$ | 30 | 150 | 50 |
| TD-108 | RO water (1:0.1) CA (1:0.1) | MEK (1:1) | 2000 | $CO_2$ | 30 | 150 | 198 |
| TD-119 | RO water (1:0.1) CA (1:0.1) | MEK (1:1) | 2000 | $CO_2$ | 30 | 150 | 184 |

*MEK free basis

The invention claimed is:

1. Method of separating and purifying products from a high pressure processing system adapted for processing a feed stream comprising carbonaceous material at a pressure of at least 150 bar and a temperature of at least 300° C., where converted feed stream is cooled to a temperature in the range 50 to 250° C., and depressurized to a pressure in the range 1 to 150 bar, the method comprising:
   separating the depressurized, converted feed stream into a gas phase, an oil phase, and a water phase comprising water soluble organics, dissolved salts and optionally suspended particles in a first phase separator; and
   purifying the oil phase from the first phase separator by mixing it with one or more washing agents, and separating the oil phase from the one or more washing agents in at least one further separation step,
   wherein gas is separated from the converted feed stream in a flash separator prior to entering the first phase separator, and the pressure of the flash separator is in the range 1 to 150 bar, and
   wherein an acidifying agent is added to at least one of the one or more washing agents comprising water, and the acidifying agent comprises $CO_2$ containing process gas.

2. Method of separating and purifying products from a high pressure processing system according to claim 1, where the converted feed stream is depressurized to a pressure in the range 10 to 150 bar prior to the first phase separator.

3. Method according to claim 1, where the at least one further separation step comprises the use of one or more phase separators, and where in each of such phase separation steps the oil phase is separated from at least one washing agent added to the oil phase prior to entering the additional phase separation step.

4. Method according to claim 3, where the weight ratio to oil of said one or more washing agents, which are added to the oil phase prior to entering each of the at least one further separation steps, is in the range 0.01 to 2.0.

5. Method according to claim 3, where the operating pressure of the one or more separators in the at least one further separation step is in the range 1 to 74 bar.

6. Method according to claim 3, where the temperature in the first separator and/or in each of the separators in the at least one further separation step is/are in the range 120 to 200° C.

7. Method according to claim 3, where the residence time in the first separator and/or in each of the separators in the at least one further separation step is/are in the range 0.1 to 30 minutes.

8. Method according to claim 3, where the oil obtained from the at least one further separation step is flashed thereby producing a gas stream comprising low boiling hydrocarbons and water and an oil stream.

9. Method according to claim 8, where the temperature of the flash of the oil obtained from the at least one further separation step is in the range 80 to 150° C.

10. Method according to claim 8, where the gas stream from said flash of the oil obtained from the at least one further separation step is condensed and further separated into a light hydrocarbon liquid phase, a gas phase and a water phase.

11. Method according to claim 10, where the separated light hydrocarbon phase is at least partly recycled and mixed with the oil phase from the first separator prior to entering the one or more separators in the at least one further separation step.

12. Method according to claim 10, where the separated light hydrocarbon phase is at least partly mixed with the separated oil phase resulting from the flash of the oil obtained from the at least one further separation step.

13. Method according to claim 3, where the liquid phase comprising washing agent(s) withdrawn from the one or more phase separators in the at least one further separation step is at least partly recycled and mixed with the oil phase from the previous separator prior to entering the subsequent separator in the further separation step.

14. Method according to claim 1, where the amount of acidifying agent(-s) is selected so that the pH of the separated washing water from each of the at least one further separation step is in the range from about 2.0 to about 7.0.

15. Method according claim 1, where the pressure of the flash separator is in the range 10 to 150 bar.

16. Method according to claim 1, where dynamic viscosity of the oil phase during said separation and purification is in the range 0.1 to 30 cP.

17. Method according to claim 1, where the one or more washing agents comprises or further comprises a viscosity and/or density reducing agent having a boiling point of less than 160° C.

18. Method according to claim 17, where the viscosity and/or density reducing agent comprises:
one or more ketones, and/or acetone, and/or propanones; and
2-heptanone, and/or buthanones, and/or pentanones, and/or pentenones, and/or cyclopentanonees, and/or hexanones, and/or cyclohexanones, and/or heptanones, and/or one or more alcohols, and/or one or more aromatic compounds, and/or one or more alkanes.

19. Method according to claim 17, where the viscosity and/or density reducing agent(-s) comprises one or more ketones in a concentration in the range 30-60% by weight, and one or more alcohols in a concentration in the range 5-30% by weight, and one or more aromatics in a concentration in the range 10 to 40% by weight, and one or more alkanes in the concentration in the range 10 to 30% by weight.

20. Method according to claim 17, where the viscosity and/or density reducing agent comprises a low boiling point fraction of the oil from the converted feed mixture comprising carbonaceous material.

21. Method according to claim 17, where the weight ratio of the viscosity reducing and/or density agent added to the amount of oil is in the range 0.01 to 2.

22. Method according to claim 1, where the operating pressure of the first separator is in the range 1 to 74 bar.

23. Method according to claim 1, where part of the oil phase is withdrawn after the first separator and recycled to prepare the feed stream to be processed by the high pressure processing system.

24. Method according to claim 1, where the one or more washing agents comprises an emulsion breaker.

25. Method according to claim 24, where said emulsion breaker comprises one or more solvents selected from the group of water, xylenes, ethanol, methanol, propanol, buthanol, toluene, phenol-formaldehyde resin, heavy and light aromatic naphtha, ethylbenzene, 1,2,4 trimethylbenzene, 1,3,5 trimethylbenzene, 1,2,3 trimethylbenzene, glutaraldehyde, 2-butanone, ethyl acetate, 1-propyl acetate, polymers of ethylene oxide, pentylamine, and butyl acrylate.

26. Method according to claim 24, where the emulsion breaker comprises three or more solvents.

27. Method according to claim 24, where the concentration of the emulsion breaker is in the range of 100 to 20000 ppm by weight.

28. Method according to claim 24, where at least a majority of the emulsion breaker remains in the oil phase after separation of the oil from the one or more washing agents.

29. Method according to claim 1, where the oil from the separation or at least a fraction thereof is further subjected to an upgrading process, where it is pressurized to a pressure in the range from about 20 bar to about 200 bar; and subsequently mixed with hydrogen and heated to a temperature in the range 250 to 400° C. in one or more steps, and contacted with one or more hydro-treating and/or hydro-processing and/or hydrocracking catalysts in one or more reaction zones, and optionally separated into different boiling point fractions.

30. Method according to claim 29, where the oil is further subjected to an ion exchange step prior to said upgrading process.

31. Method according to claim 30, where the ion exchange step uses one or more cation resins.

* * * * *